US010136342B2

(12) United States Patent
Anantha et al.

(10) Patent No.: US 10,136,342 B2
(45) Date of Patent: Nov. 20, 2018

(54) SYSTEM AND METHOD TO FACILITATE WIRELESS NETWORK OPTIMIZATION

(71) Applicant: CISCO TECHNOLOGY, INC., San Jose, CA (US)

(72) Inventors: Swaminathan A. Anantha, Mountain View, CA (US); Mickael James Graham, Bellevue Hill (AU); Pei-An Lee, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/485,060

(22) Filed: Apr. 11, 2017

(65) Prior Publication Data

US 2018/0295528 A1 Oct. 11, 2018

(51) Int. Cl.

*H04W 24/00* (2009.01)
*H04W 24/02* (2009.01)
*H04W 24/08* (2009.01)
*H04L 12/26* (2006.01)

(52) U.S. Cl.

CPC ............. *H04W 24/02* (2013.01); *H04L 43/16* (2013.01); *H04W 24/08* (2013.01)

(58) Field of Classification Search

CPC ........ H04W 24/02; H04W 24/08; H04L 43/16
USPC .......................................................... 455/424
See application file for complete search history.

(56) References Cited

U.S. PATENT DOCUMENTS 8,934,414 B2 1/2015 Luna
9,332,458 B2 5/2016 Nuss et al.
9,379,836 B2 6/2016 Wu et al.
2006/0240840 A1 10/2006 Morgan et al.
2009/0054047 A1* 2/2009 Kylvaja .............. H04L 41/0823 455/418
2013/0286851 A1* 10/2013 Moser .................. H04W 88/10 370/241.1

(Continued)

FOREIGN PATENT DOCUMENTS

EP 2947908 A1 11/2015

OTHER PUBLICATIONS

PCT Notification of Transmittal of The International Search Report and the Written Opinion of the International Searching Authority, or the Declartion for Application No. PCT/US2018/025222 dated Jun. 1, 2018.

(Continued)

*Primary Examiner* — William Nealon

(57) ABSTRACT

An example method is provided in one example embodiment and may include determining one or more outlier access points (APs) of a plurality of APs managed by a same service provider, wherein the determining is performed based on performance metrics calculated for each of the plurality of APs and wherein each outlier AP has a performance metric that fails to satisfy a performance metric threshold; identifying a Radio Frequency (RF) cluster to which each outlier AP belongs, wherein each outlier AP belongs to only one RF cluster; applying one or more optimization parameters to one or more APs for one or more RF clusters; and calculating new performance metrics for the plurality of APs to determine whether any of the plurality of APs fail to satisfy the performance metric threshold after the one or more optimization parameters are applied.

17 Claims, 11 Drawing Sheets

(56) References Cited

U.S. PATENT DOCUMENTS

| | | | | |
|---|---|---|---|---|
| 2013/0329588 | A1* | 12/2013 | Sangwan | H04W 24/02 370/252 |
| 2013/0331109 | A1 | 12/2013 | Dhillon et al. | |
| 2015/0055590 | A1 | 2/2015 | Wu et al. | |
| 2015/0087325 | A1* | 3/2015 | Nuss | H04W 28/08 455/453 |
| 2015/0341211 | A1 | 11/2015 | Saha et al. | |
| 2016/0157126 | A1 | 6/2016 | Nuss et al. | |
| 2016/0165472 | A1* | 6/2016 | Gopalakrishnan | H04W 24/10 455/67.11 |
| 2016/0294636 | A1 | 10/2016 | Kalika et al. | |

OTHER PUBLICATIONS

Tom Alexander: Installation Test In: Optimizing and Testing WLANs Apr. 1, 2011 (Apr. 1, 2011). Elsevier Science & Technology, XP055476699, ISBN: 978-0-7506-7986-2 pp. 181-206, p. 186-p. 205.

* cited by examiner

100
WLAN ACCESS NETWORK 110
INTERNET
140
SERVICE PROVIDER (SP1) NETWORK 120
SUBSCRIBER DATABASE
126
ACS
124
RRM
122
OPTIMIZATION SYSTEM
130
AP 104.1
AP 104.2
AP 104.3
AP 104.4
AP 104.5
AP 106.1
AP 106.2
AP 106.3
AP 108.1
AP 108.1
AP 108.2
AP 108.3
102.1
102.2
102.3
102.4
102.5
102.6
102.7
102.8
102.9
102.10
102.11
102.12
102.13
102.14
102.15
°F/C
RF CONNECTION
DETECTED NEIGHBOR
SP1 MANAGED AP
OTHER SP MANAGED AP
UNMANAGED AP

130
OPTIMIZATION SYSTEM
137.1–137.N
136
CONTROL LOGIC
139.1.1
OPTIMIZER LOGIC
139.1.2
OPTIMIZER LOGIC
139.1.M
OPTIMIZER LOGIC
CLUSTER MANAGAGEMENT LOGIC
138.1
OPTIMIZATION GROUP LOGIC
135
PROCESSOR(S)
131
MEMORY ELEMENT(S)
132
STORAGE
133
NETWORK INTERFACES
134

WLAN ACCESS NETWORK 110
OPTIMIZATION GROUP 200
INITIAL RF CLUSTER$_1$ 202.1
INITIAL RF CLUSTER$_2$ 202.2
INITIAL RF CLUSTER$_3$ 202.3
AP 104.1 (OUTLIER)
AP 104.2
AP 104.3 (OUTLIER)
AP 104.4
AP 104.5 (OUTLIER)
AP 106.1
AP 106.2
AP 106.3
AP 108.1
AP 108.2
AP 108.3
DETECTED NEIGHBOR
SP1 MANAGED AP
OTHER SP MANAGED AP
UNMANAGED AP

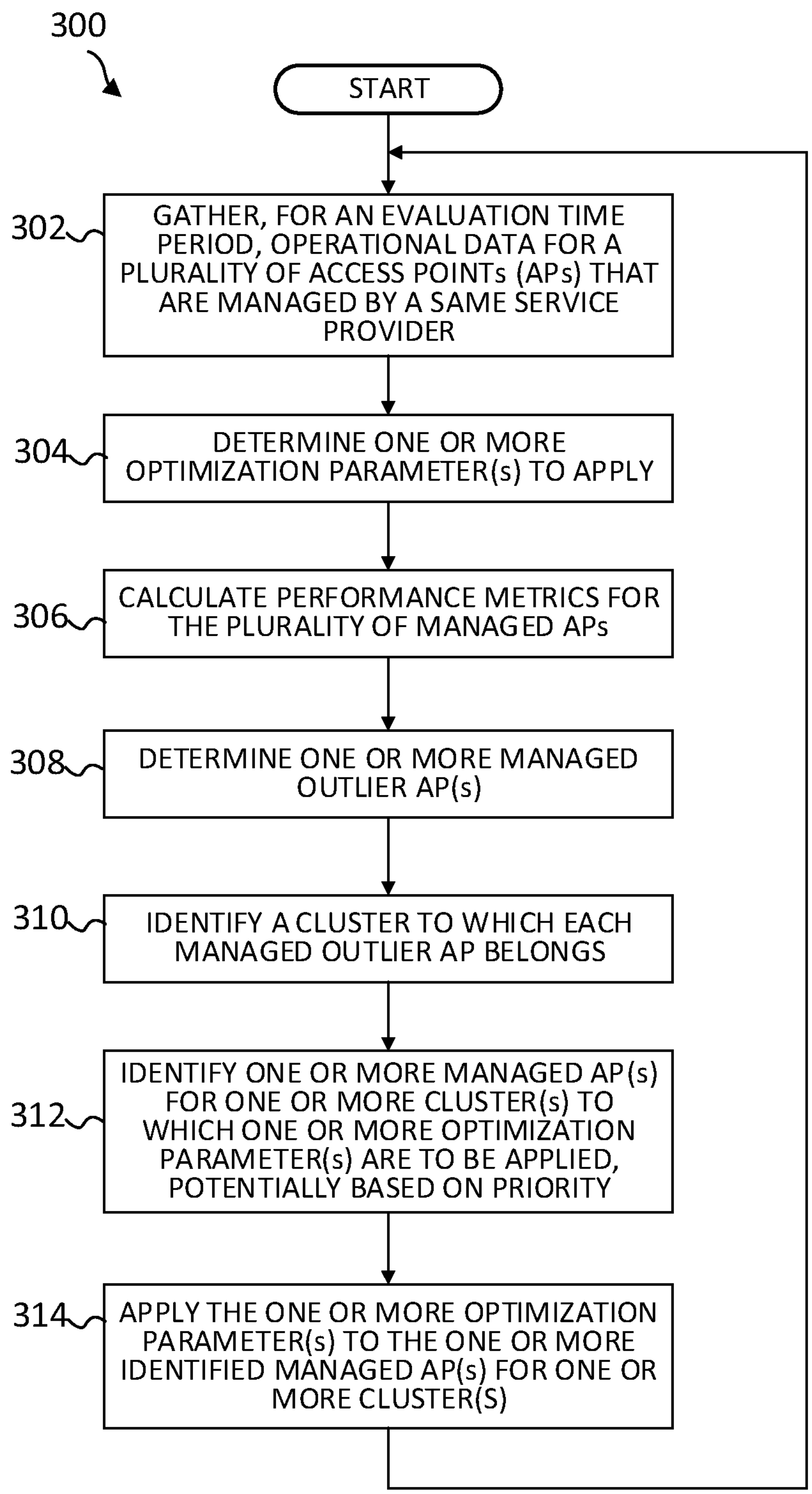
FIG. 3
300
START
302
GATHER, FOR AN EVALUATION TIME PERIOD, OPERATIONAL DATA FOR A PLURALITY OF ACCESS POINTs (APs) THAT ARE MANAGED BY A SAME SERVICE PROVIDER
304
DETERMINE ONE OR MORE OPTIMIZATION PARAMETER(s) TO APPLY
306
CALCULATE PERFORMANCE METRICS FOR THE PLURALITY OF MANAGED APs
308
DETERMINE ONE OR MORE MANAGED OUTLIER AP(s)
310
IDENTIFY A CLUSTER TO WHICH EACH MANAGED OUTLIER AP BELONGS
312
IDENTIFY ONE OR MORE MANAGED AP(s) FOR ONE OR MORE CLUSTER(s) TO WHICH ONE OR MORE OPTIMIZATION PARAMETER(s) ARE TO BE APPLIED, POTENTIALLY BASED ON PRIORITY
314
APPLY THE ONE OR MORE OPTIMIZATION PARAMETER(s) TO THE ONE OR MORE IDENTIFIED MANAGED AP(s) FOR ONE OR MORE CLUSTER(S)

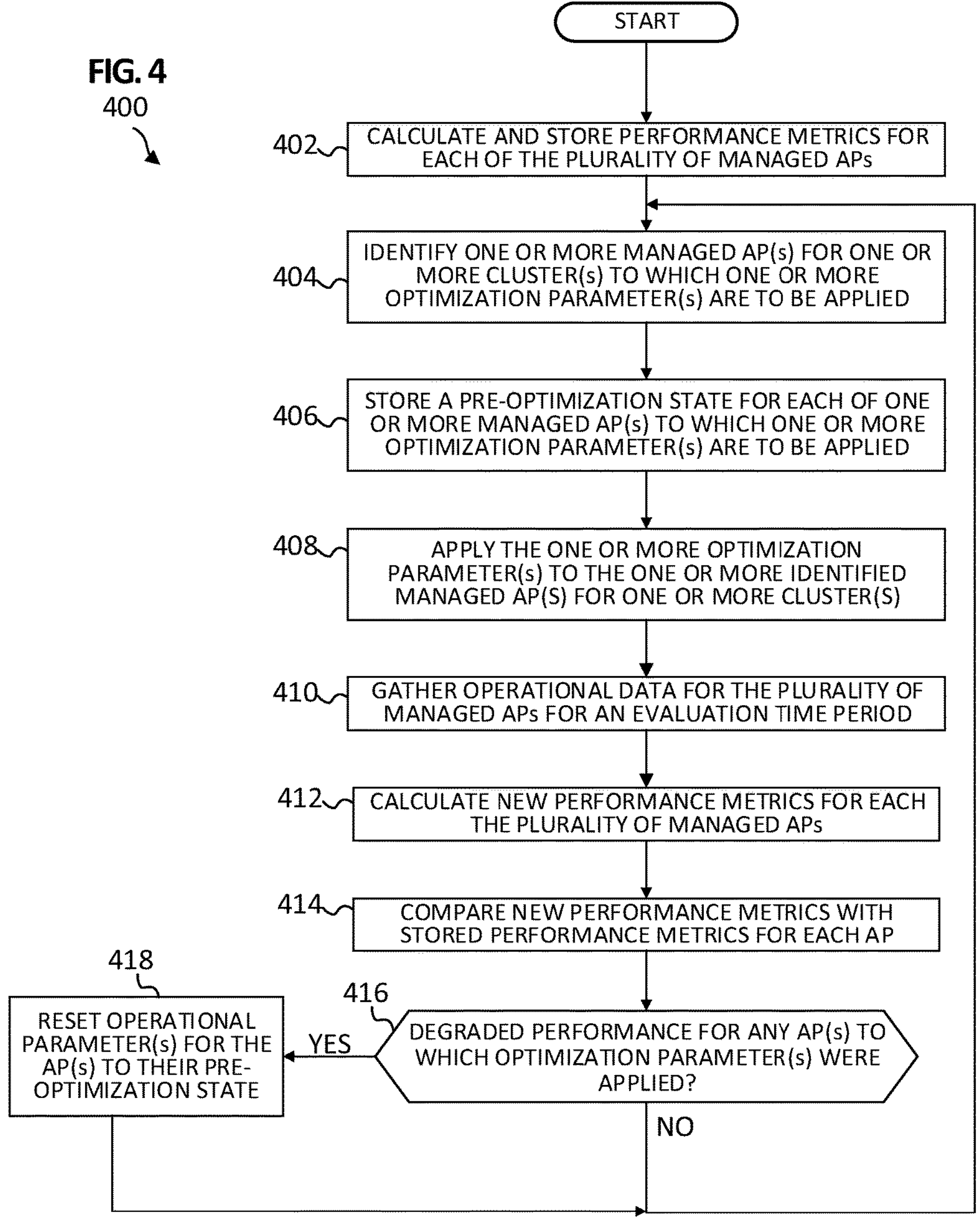
FIG. 4
400
START
402
CALCULATE AND STORE PERFORMANCE METRICS FOR EACH OF THE PLURALITY OF MANAGED APs
404
IDENTIFY ONE OR MORE MANAGED AP(s) FOR ONE OR MORE CLUSTER(s) TO WHICH ONE OR MORE OPTIMIZATION PARAMETER(s) ARE TO BE APPLIED
406
STORE A PRE-OPTIMIZATION STATE FOR EACH OF ONE OR MORE MANAGED AP(s) TO WHICH ONE OR MORE OPTIMIZATION PARAMETER(s) ARE TO BE APPLIED
408
APPLY THE ONE OR MORE OPTIMIZATION PARAMETER(s) TO THE ONE OR MORE IDENTIFIED MANAGED AP(S) FOR ONE OR MORE CLUSTER(S)
410
GATHER OPERATIONAL DATA FOR THE PLURALITY OF MANAGED APs FOR AN EVALUATION TIME PERIOD
412
CALCULATE NEW PERFORMANCE METRICS FOR EACH THE PLURALITY OF MANAGED APs
414
COMPARE NEW PERFORMANCE METRICS WITH STORED PERFORMANCE METRICS FOR EACH AP
416
DEGRADED PERFORMANCE FOR ANY AP(s) TO WHICH OPTIMIZATION PARAMETER(s) WERE APPLIED?
YES
NO
418
RESET OPERATIONAL PARAMETER(s) FOR THE AP(s) TO THEIR PRE-OPTIMIZATION STATE

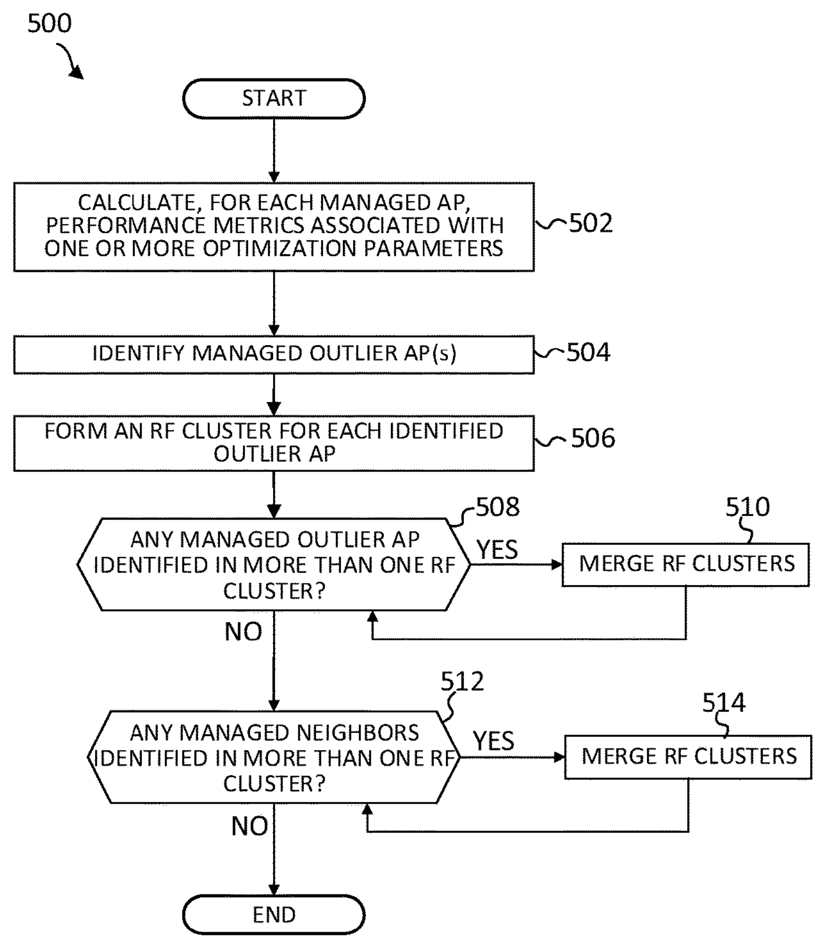
FIG. 5
500
START
CALCULATE, FOR EACH MANAGED AP, PERFORMANCE METRICS ASSOCIATED WITH ONE OR MORE OPTIMIZATION PARAMETERS
502
IDENTIFY MANAGED OUTLIER AP(s)
504
FORM AN RF CLUSTER FOR EACH IDENTIFIED OUTLIER AP
506
508
510
ANY MANAGED OUTLIER AP IDENTIFIED IN MORE THAN ONE RF CLUSTER?
YES
MERGE RF CLUSTERS
NO
512
514
ANY MANAGED NEIGHBORS IDENTIFIED IN MORE THAN ONE RF CLUSTER?
YES
MERGE RF CLUSTERS
NO
END

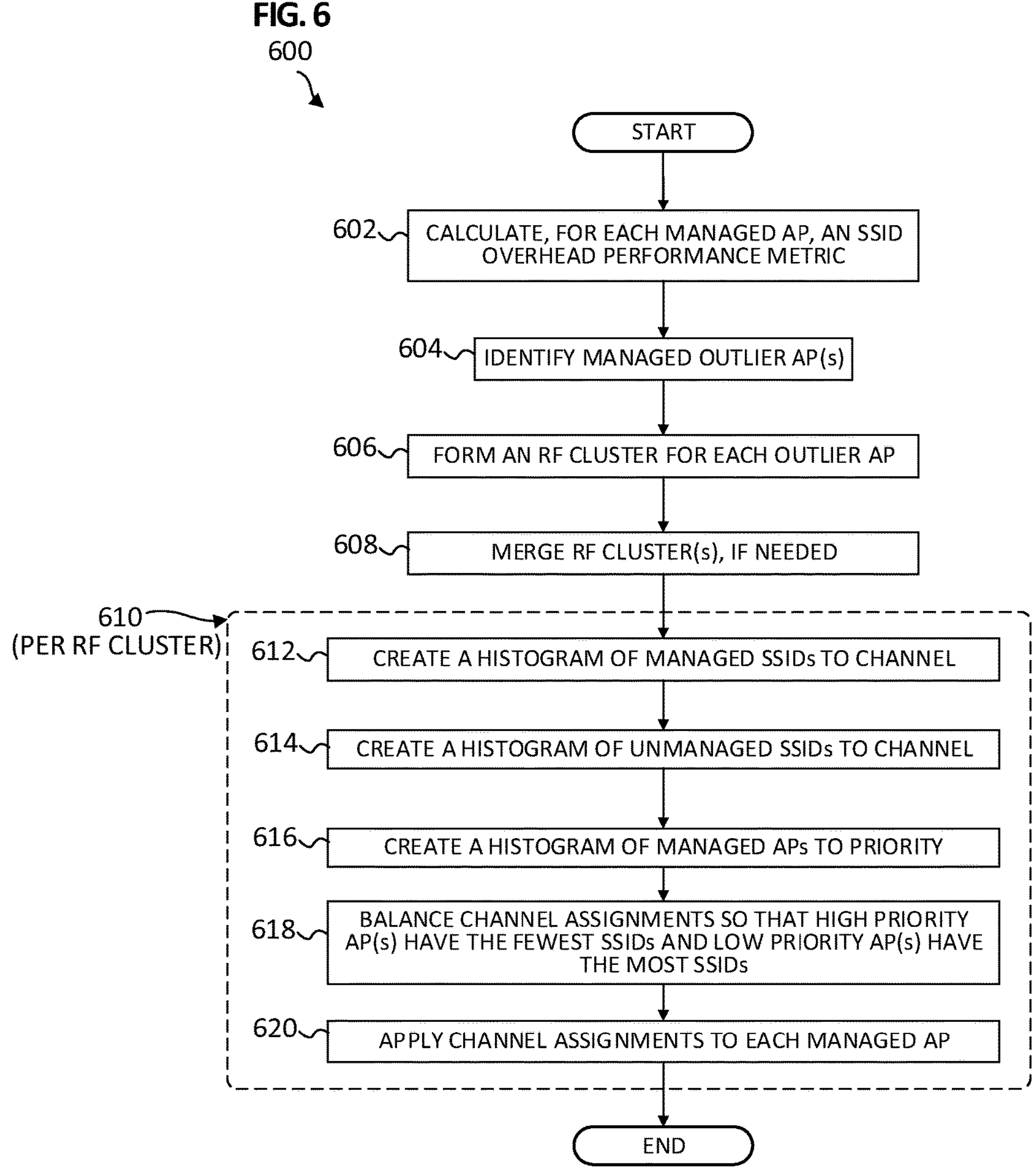
FIG. 6
600
START
602
CALCULATE, FOR EACH MANAGED AP, AN SSID OVERHEAD PERFORMANCE METRIC
604
IDENTIFY MANAGED OUTLIER AP(s)
606
FORM AN RF CLUSTER FOR EACH OUTLIER AP
608
MERGE RF CLUSTER(s), IF NEEDED
610
(PER RF CLUSTER)
612
CREATE A HISTOGRAM OF MANAGED SSIDs TO CHANNEL
614
CREATE A HISTOGRAM OF UNMANAGED SSIDs TO CHANNEL
616
CREATE A HISTOGRAM OF MANAGED APs TO PRIORITY
618
BALANCE CHANNEL ASSIGNMENTS SO THAT HIGH PRIORITY AP(s) HAVE THE FEWEST SSIDs AND LOW PRIORITY AP(s) HAVE THE MOST SSIDs
620
APPLY CHANNEL ASSIGNMENTS TO EACH MANAGED AP
END

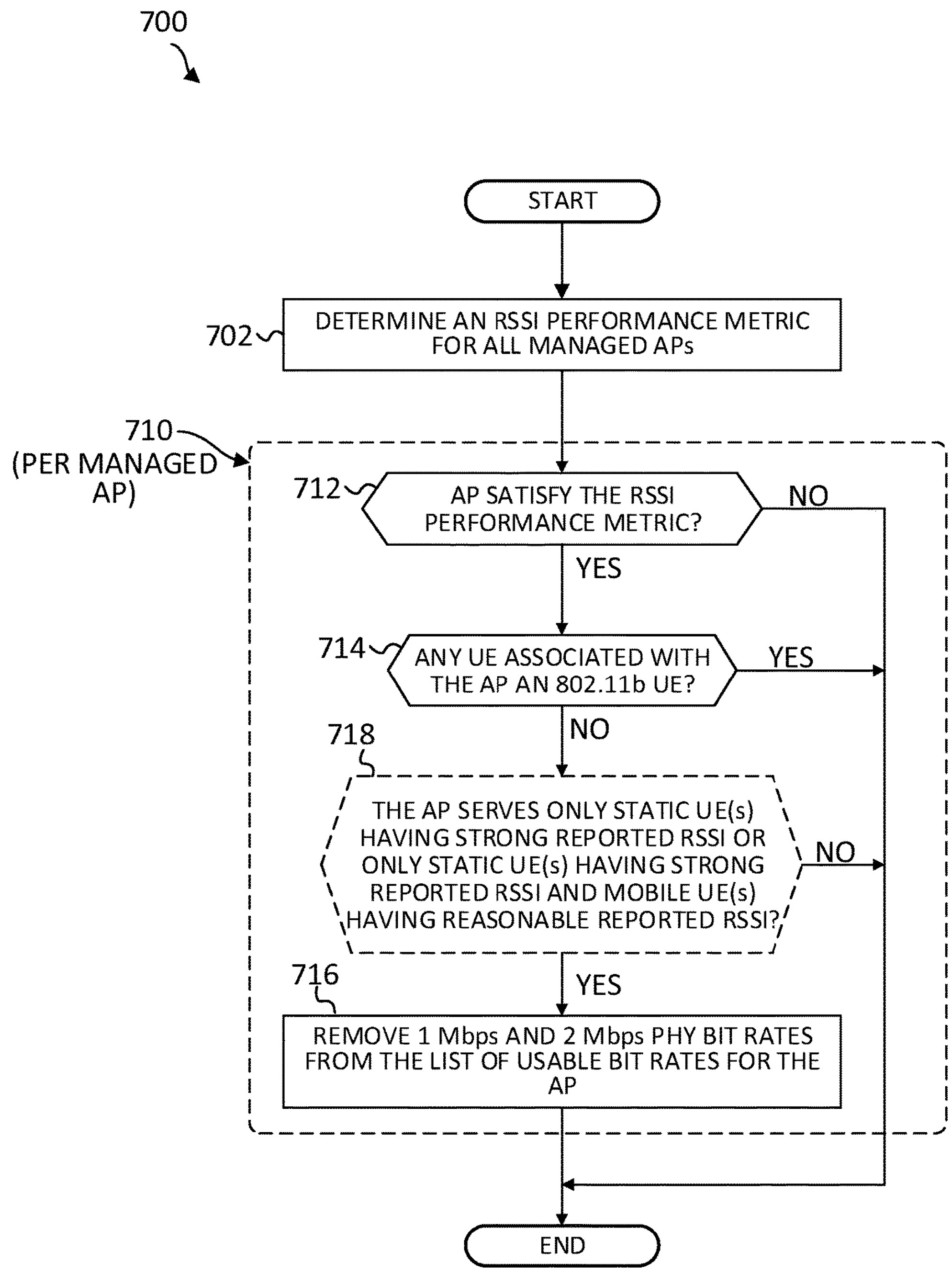
FIG. 7
700
START
702
DETERMINE AN RSSI PERFORMANCE METRIC FOR ALL MANAGED APs
710
(PER MANAGED AP)
712
AP SATISFY THE RSSI PERFORMANCE METRIC?
NO
YES
714
ANY UE ASSOCIATED WITH THE AP AN 802.11b UE?
YES
NO
718
THE AP SERVES ONLY STATIC UE(s) HAVING STRONG REPORTED RSSI OR ONLY STATIC UE(s) HAVING STRONG REPORTED RSSI AND MOBILE UE(s) HAVING REASONABLE REPORTED RSSI?
NO
YES
716
REMOVE 1 Mbps AND 2 Mbps PHY BIT RATES FROM THE LIST OF USABLE BIT RATES FOR THE AP
END

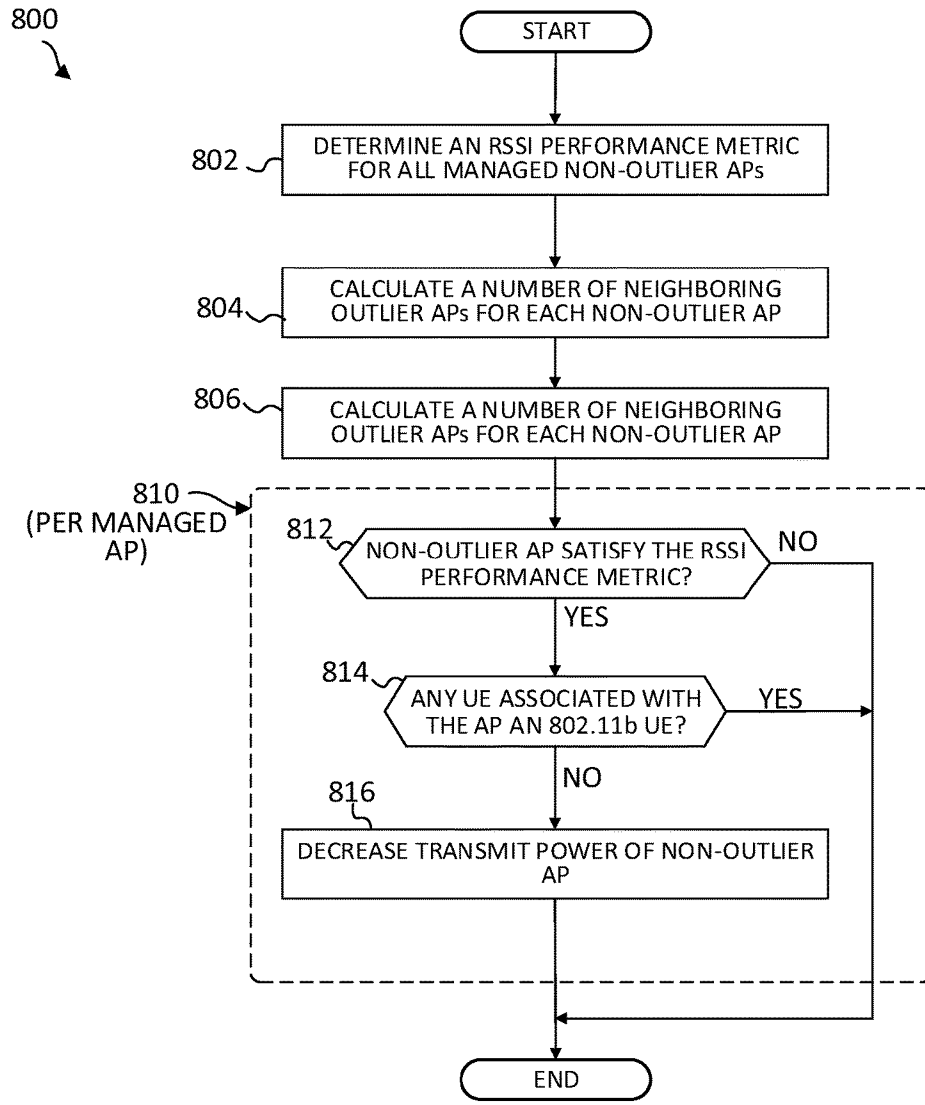

FIG. 8
800
START
802
DETERMINE AN RSSI PERFORMANCE METRIC FOR ALL MANAGED NON-OUTLIER APs
804
CALCULATE A NUMBER OF NEIGHBORING OUTLIER APs FOR EACH NON-OUTLIER AP
806
CALCULATE A NUMBER OF NEIGHBORING OUTLIER APs FOR EACH NON-OUTLIER AP
810
(PER MANAGED AP)
812
NON-OUTLIER AP SATISFY THE RSSI PERFORMANCE METRIC?
NO
YES
814
ANY UE ASSOCIATED WITH THE AP AN 802.11b UE?
YES
NO
816
DECREASE TRANSMIT POWER OF NON-OUTLIER AP
END

900
START
902
COLLECT A SUBSCRIBER VALUE PER MANAGED AP
904
CALCULATE A PRIORITY VALUE PER AP FOR AN EVALUATION TIME PERIOD
906
CATEGORIZE THE APs INTO PRIORITY GROUPS TO BE USED FOR IDENTIFYING ONE OR MORE AP(s) TO WHICH CERTAIN OPTIMIZATION PARAMETER(s) ARE TO BE APPLIED
END

SYSTEM AND METHOD TO FACILITATE WIRELESS NETWORK OPTIMIZATION

TECHNICAL FIELD

This disclosure relates in general to the field of communications and, more particularly, to a system and method to facilitate wireless network optimization.

BACKGROUND

Networking architectures have grown increasingly complex in communication environments, particularly mobile wireless environments. For example, network service providers can deploy wireless access points, at subscriber residences, in public buildings, along roads, etc. that can provide wireless connectivity for subscribers. As the number of subscribers and the number of network service providers increases, many wireless access points can be deployed and can cause increased interference between wireless access points and/or subscriber devices. Increased interference can decrease wireless access point performance and/or the Quality of Experience (QoE) for subscribers. Accordingly, there are significant challenges in optimizing wireless network performance, in particular for wireless access points managed by a same service provider.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 3 is a simplified flow diagram illustrating example operations that can be performed to facilitate wireless network optimizations in accordance with one potential embodiment;

FIG. 4 is a simplified flow diagram illustrating other example operations that can be performed to facilitate wireless network optimizations in accordance with one potential embodiment;

FIG. 5 is a simplified flow diagram illustrating example clustering operations that can be performed to facilitate wireless network optimizations in accordance with one potential embodiment;

FIGS. 6-8 are simplified flow diagrams illustrating yet other example operations that can be performed to facilitate wireless network optimizations in accordance with various potential embodiments.

DETAILED DESCRIPTION OF EXAMPLE EMBODIMENTS

Overview

Figure 1A:
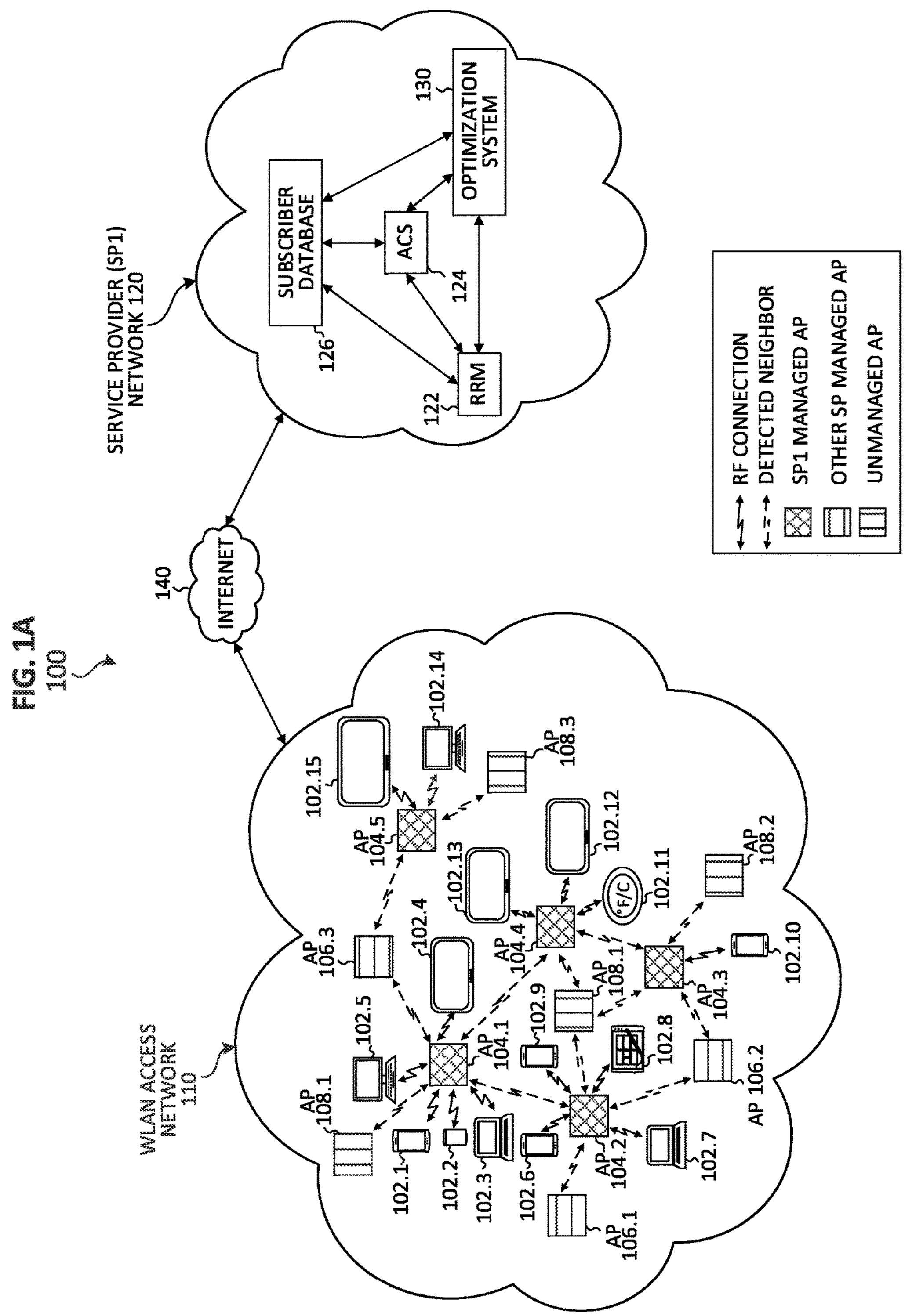
FIG. 1A is a simplified block diagram illustrating a communication system that can facilitate wireless network optimization according to one embodiment of the present disclosure.

A method is provided in one example embodiment and may include determining one or more outlier access points (APs) of a plurality of APs managed by a same service provider, wherein the determining is performed based on performance metrics calculated for each of the plurality of APs managed by the same service provider and wherein each outlier AP has a performance metric that fails to satisfy a performance metric threshold; identifying a Radio Frequency (RF) cluster to which each outlier AP belongs, wherein each outlier AP belongs to only one RF cluster; applying one or more optimization parameters to one or more APs for one or more RF clusters, wherein the optimization parameters are applied to improve performance for at least one of the one or more outlier APs; and calculating new performance metrics for the plurality of APs to determine whether any of the plurality of APs fail to satisfy the performance metric threshold after the one or more optimization parameters are applied. In various instances, neighbor AP(s) of a particular AP can include: one or more AP(s) managed by the same service provider; one or more AP(s) managed by one or more different service provider(s); and one or more unmanaged AP(s).

In some cases, the method can further include repeating the determining, the identifying, the applying and the calculating for any outlier AP that fails to satisfy the performance metric threshold to improve performance for at least one AP of the plurality of APs. In still some cases, the method can further include storing, for each of the one or more outlier APs, a pre-optimization state that identifies operational parameters associated with each of the one or more outlier APs before applying the one or more optimization parameters; determining degraded performance by a particular outlier AP following the applying of the one or more optimization parameters to the particular AP; and resetting operation parameters for the particular outlier AP to their pre-optimization state.

In some instances, determining the one or more outlier AP(s) can be performed after an evaluation time period during which data is collected for each of the plurality of APs managed by the same service provider and before the one or more optimization parameters are applied, wherein no RF cluster determinations are performed during the evaluation time period. In still some instances, identifying the RF cluster to which each outlier AP belongs can further include: identifying one or more neighbor AP(s) of each outlier AP; creating an RF cluster that identifies neighbor(s) for each outlier AP; determining whether any outlier AP is a neighbor of another outlier AP; and merging any RF cluster for two or more outlier APs based on a determination that the two or more outlier APs are neighbors of each other.

In still some cases, the method can include determining one or more optimization parameters for one or more outlier AP of one or more cluster, wherein the one or more optimization parameters include at least one of: a transmission power value or transmission power range; a communication channel number or a particular combination of communication channel numbers; a communication channel band or a combination of communication channel bands; a communication frequency or a range of communication frequencies; and a physical layer bit rate value or physical layer bit rate range.

In still some cases, the method can further include: prioritizing a plurality of outlier APs belonging to a particular RF cluster to determine a priority value for each outlier AP belonging to the particular RF cluster; and applying one or more optimization parameters to the plurality of outlier APs based on whether the priority value for each outlier satisfies a priority threshold. In some instances, the applying can include applying one or more optimization parameters to one or more first outlier APs that satisfy the priority threshold to improve performance of the one or more first outlier APs; and applying one or more optimization parameters to one or more second outlier APs that do not satisfy the priority threshold to degrade performance of the one or more second outlier APs.

In still some instances, the prioritizing can further include calculating the priority value for each outlier AP based on one or more priority parameters, wherein the priority parameters can include any combination of: (a) a total data usage for each outlier AP for an evaluation time period during which data is collected for each of the plurality of APs; (b) a total number of mobile user equipment served by each outlier AP; (c) a total number of static user equipment served by each outlier AP; (d) a total active time per day for each outlier AP for an evaluation time period during which data is collected for each of the plurality of APs; (e) a total amount of one of Voice over WiFi (VoWiFi) usage and video usage for each outlier AP; (f) historical priority parameters associated with one or more of: (a), (b), (c), (d) and (e), wherein the historical priority parameters can be associated with a time period less than or equal to one previous year for which the priority parameters have been collected; or (g) a subscriber value for each outlier AP, wherein the subscriber value for each outlier AP is assigned by the service provider.

In some instances, wherein the evaluation time period can include one or more of: a randomly selected number of minutes in a day, a particular number of minutes in the day or a periodically selected number of minutes in the day; one or more randomly selected days of a week, one or more particular days of the week or one or more particular days of the week that are evaluated periodically on a scheduled basis; or one or more randomly selected months of a year, one or more particular months of the year or one or more particular months of the year that are evaluated periodically on a scheduled basis.

Example Embodiments

Turning to FIG. 1A, FIG. 1A is a simplified block diagram illustrating a communication system 100 to facilitate wireless network optimization according to one embodiment of the present disclosure. In one embodiment, the configuration illustrated in FIG. 1 may be tied to a Wireless Local Area Network (WLAN) architecture such as, for example, Institute of Electrical and Electronic Engineers (IEEE) 802.11 Wi-Fi access network and/or a WiGig access network, which can include a Hotspot 2.0 access networks, and/or a 802.16 Worldwide Interoperability for Microwave Access (WiMAX) access network. Alternatively, the depicted architecture can be applicable to other environments equally such as, for example, a millimeter wave access network architecture.

As referred to herein in this Specification, the terms 'instance', 'virtual machine', 'virtualized network function' and 'virtualized network functionality' can encompass an emulation of a computer system and/or computing platform operating based on the computer architecture and functions of a real or hypothetical computer, with particular embodiments involving specialized hardware, software, or a combination of both. In various embodiments, a logic instance, a virtualized network function (VNF), a virtual machine (VM), a virtualized network function component (VNFC), virtualized functionality, variations thereof and/or any virtualized network controller, element, module, aggregator, combinations thereof or the like as described herein may be instantiated or otherwise initialized to execute via a hypervisor-based virtualization or a container-based virtualization of a server (e.g., blade server, rack server, stand-alone server, data center server, cloud server) using the server's hardware (e.g., processor(s) and memory element(s)) and/or operating system for a given network environment.

Various terms are used herein in reference to WLAN architectures including: Basic Service Set (BSS), BSS Identifier (BSSID), Service Set Identifier (SSID), Extended Service Set (ESS) and ESS Identifier (ESSID). A wireless AP and its associated user equipment (UE), sometimes referred to as stations (STA) is typically referenced as a BSS. A BSS can be identified by a BSSID, which is typically the Medium Access Control (MAC) address of a given wireless AP. An SSID is typically a human readable name for a BSS. A collection of BSSs in a WLAN is typically referenced as an ESS, which can be identified using an ESSID. Often the ESSID and SSID are the same. Over-the-Air (OTA) Radio Frequency (RF) communications in a WLAN are facilitated through the use of packets, often referred to as 'frames'. Various frame types can be utilized in IEEE 802.11 architectures including, but not limited to: management frames that enable communications between UEs and APs to be established and maintained; beacon frames that carry AP and/or WLAN information such as BSSID, SSID, timestamps, etc. and data frames data frames that can carry communication protocol information and/or data. Generally, frames include a control field, source and destination MAC addresses and a payload or frame body. The control field can carry various control information and/or parameters including 802.11 protocol version, frame type information, etc.

The example architecture of FIG. 1A for communication system 100 includes a WLAN access network 110, a service provider (SP) network 120 and an Internet 140. Service provider network 120 can be associated with a same service provider, referred to herein as a first service provider denoted as 'SP1'; thus, service provider network 120 can also be referred to herein as 'SP1 network 120'.

WLAN access network 110 can include user equipment (UE) 102.1-102.15 and a number of WLAN (e.g., Wi-Fi) access points (APs). A WLAN or Wi-Fi AP within WLAN access network 110 can be referred to herein more generally as an 'AP'. APs within WLAN access network 110 can include managed APs 104.1-104.5 that are managed by a same service provider, managed APs 106.1-106.3 that are managed by other service providers different than SP1 and unmanaged APs 108.1-108.3. The terms 'managed' and 'unmanaged' as referred to herein in this Specification relate to service provider management versus individual user management of an AP. By 'managed' it is meant that a service provider provides configuration and control to manage the operation of APs and by 'unmanaged' it is meant that configuration and control of APs is not managed by a service provider (e.g., an individual user determines the configuration and control for operation of unmanaged APs).

Service provider network 120 can include a Radio Resource Manager (RRM) 122, an Auto-Configuration System (ACS) 124, a subscriber database 126 and an optimization system 130. One or more elements of SP1 network 120 can exchange communications with SP1 managed APs 104.1-104.5 via Internet 140. In some embodiments, connectivity for portions of WLAN access network 110 and SP1 network 120 can overlap with Internet 140 in whole or in part. Additional example details associated with optimization system 130 are illustrated in FIG. 1B, discussed below.

Figure 1B:
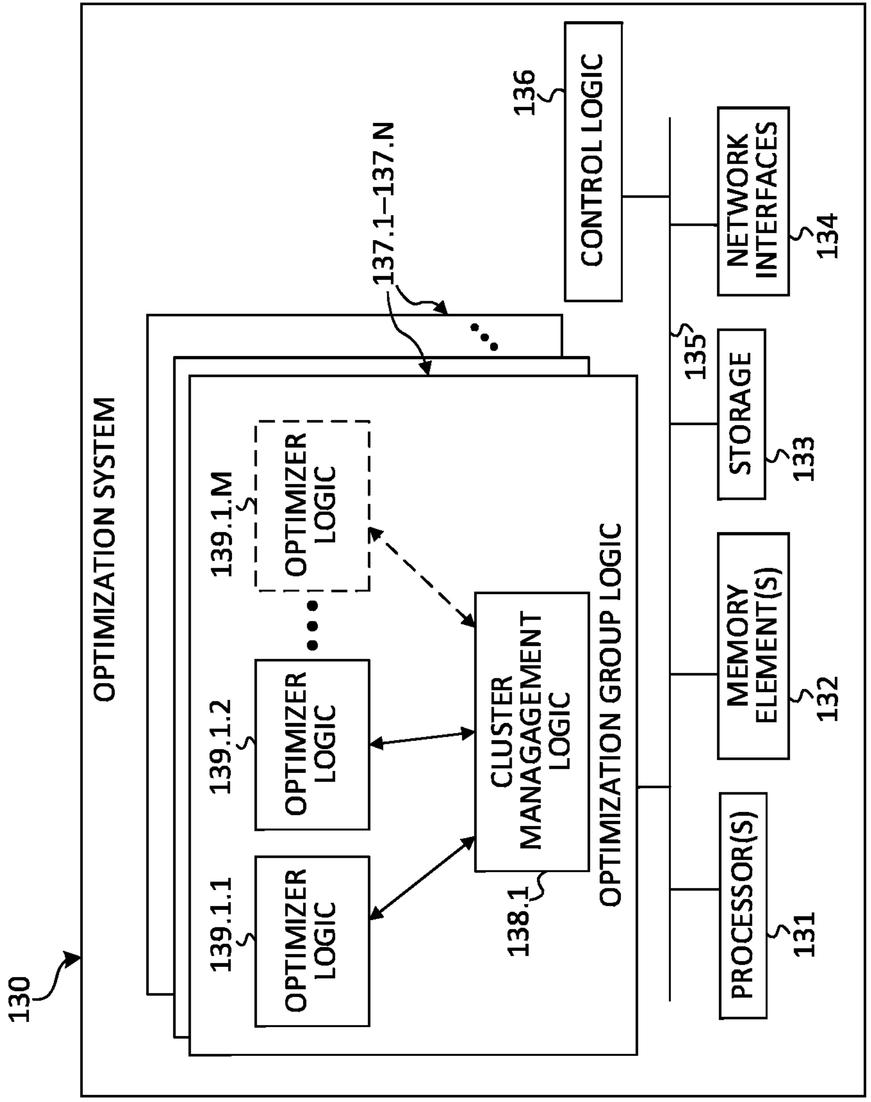
FIG. 1B is a simplified block diagram illustrating example details that can be associated with an optimization system in accordance with one potential embodiment of the communication system.

Referring to FIG. 1B, FIG. 1B is a simplified block diagram illustrating example details that can be associated with optimization system 130 in accordance with at least one embodiment of communication system 100. FIG. 1B includes optimization system 130, which can include one or more processor(s) 131, one or more memory element(s) 132, storage 133, network interfaces 134, a bus 135, control logic 136 and a number of instance(s) of optimization group logic 137.1-137.N in which each instance of optimization group logic can include an instance of cluster management logic (e.g., cluster management logic 138.1 for optimization group logic instance 137.1) and a number of instance(s) of optimizer logic (e.g., optimizer logic instance(s) 139.1.1-139.1.M for optimization group logic instance 137.1).

The number of instance(s) of optimization group logic 137.1-137.N that may be dynamically instantiated during operation of communication system 100 can be based on a number of optimization groups that optimization system 130 is optimizing in which an optimization group logic instance can be instantiated for each optimization group that optimization system 130 is responsible for optimizing. The number of instance(s) of optimizer logic that may be dynamically instantiated during operation of communication system 100 for a given instance of optimization group logic can based on a number of Radio Frequency RF cluster(s) identified for a particular optimization group and can change across multiple optimization iterations. Each optimization group logic instance 137.1-137.N can have its own associated number of instance(s) of optimizer logic instantiated during operation. Optimization groups and RF clusters are discussed in further detail herein.

Returning to FIG. 1A, UEs (e.g., any of UE 102.1-102.15) can connect to and exchange over-the-air (OTA) Radio Frequency (RF) communications with one or more APs within WLAN access network 110. For purposes of illustrating various features of communication system 100, certain UE are assumed to be connected to certain APs. It should be understood, however, that any UE 102.1-102.15 are capable of connecting to any WLAN AP under an assumption that the UE are authorized to connect to a given AP and within a coverage area of the given AP. Although only a limited number of UEs and APs are illustrated in the embodiment of FIG. 1, it should be understood that communication system 100 can include any number of UEs and APs in accordance with the teachings of the present disclosure.

For purposes of embodiments described herein, UE 102.1-102.5 can be connected to managed AP 104.1, UE 102.6-102.9 can be connected to managed AP 104.2, UE 102.10 can be connected to managed AP 104.3, UE 102.11-102.13 can be connected to managed AP 104.4 and UE 102.14-102.15 can be connected to managed AP 104.5. As referred to herein in this Specification a 'managed AP' (e.g., any of managed APs 104.1-104.5) can be referred to interchangeably as a 'managed Wi-Fi AP' or a 'managed wireless AP'.

In general, WLAN access network 110 may provide a communications interface between any UE 102.1-102.15, Internet 140 and SP1 network 120 via managed APs 104.1-104.5 and potentially other APs to which the UEs may be authorized to connect. In various embodiments, WLAN access network 110 may include access networks such as an IEEE 802.11 Wi-Fi access network and/or a WiGig access network, which can include Hotspot 2.0 access networks, and/or an 802.16 WiMAX access network. In various embodiments, APs within WLAN access network 110 can be configured with one or more transmitter(s), receiver(s), processor(s), controller(s), memory element(s), storage, etc. to facilitate OTA RF communications (e.g., 802.11 Wi-Fi, Hotspot 2.0, etc.) between any UE 102.1-102.15 and any WLAN AP. In various embodiments, any WLAN AP within deployed in communication system 100 can be configured as Wi-Fi AP, a Wi-Fi Hotspot 2.0 AP, WiMAX AP, combinations thereof or any other WLAN AP as may be defined by IEEE standards, Wi-Fi Alliance® standards, IETF standards, combinations thereof or the like. In some embodiments, a WLAN AP can be configured as a residential gateway (RG), which can provide both wired (e.g., Ethernet) connectivity and wireless (e.g., Wi-Fi) connectivity.

Within SP1 network 120, RRM 122 may be responsible for RF management (e.g., configuration and control) operations associated with managed APs 104.1-104.5. In various embodiments, RF management can include setting various Wi-Fi related settings including, but not limited to: setting RF communication channels, Physical (PHY) layer wireless bit rates or modes, RF communication frequency band (e.g., 2.4 Gigahertz (GHz), 5 GHz, etc.) and/or transmission (Tx) power level.

IEEE 802.11 standards provide that Wi-Fi channels can have a 20-22 MHz bandwidth and are typically separated incrementally in 5 MHz steps. In general, 14 channels can be utilized for Wi-Fi communications in the 2.4 GHz band; however, only 3 non-overlapping channels (e.g., 1, 6 and 11 or 2, 7 and 12, etc.) can typically be utilized for a deployment. Generally, 24 channels can be utilized for Wi-Fi communications in the 5 GHz band. Different IEEE 802.11 variants can utilize different frequency bands. For example, IEEE 802.11a utilizes the 5 GHz band, 802.11b utilizes the 2.4 GHz band, 802.11g utilizes the 2.4 GHz band, 802.11n can utilizes the 2.4 and 5 GHz bands 802.11ac can utilize the 2.4 and 5 GHz bands. Different data rates can be achieved for different IEEE 802.11 variants and can vary widely depending on modulation type, deployment, etc.; however, Legacy 802.11 has a maximum data rate of 2 Megabits per second (Mbps), IEEE 802.11a has a maximum data rate of 54 Mbps, IEEE 802.11b has a maximum data rate of 11 Mbps, IEEE 802.11g has a maximum data rate of 54 Mbps, IEEE 802.11n can theoretically achieve data rates up to 600 Mbps and IEEE 802.11ac can achieve Gigabit per second (Gbps) data rates.

RRM 122 in combination with ACS 124 system wide wireless LAN functions, including but not limited to: establishing AP sessions (e.g., during power-on, reset, etc.) between managed APs 104.1-104.5 and SP1 network 120; provisioning security policies, service policies, subscriber policies, subscription information, etc. for managed APs 104.1-104.5; providing intrusion prevention, Quality of Service (QoS) functions, and/or mobility functions for WLAN access network 110 and one or more of managed APs 104.1-104.5; combinations thereof or the like. In some embodiments, ACS 124 functionality can be provided as prescribed in Broadband Forum Technical Report (TR) TR-069, Issue 1 Amendment 5, version 1.4, issued November 2013. In other embodiments, ACS 124 functionality can be provisioned as prescribed by other protocols, data models, etc.

Subscriber database 126 can store subscriber information associated for subscribers associated with one or more UE(s) and/or subscriber information associated with one or more of managed APs 104.1-104.5. In various embodiments, subscriber information can include, but not be limited to: security policies associated with UE and/or AP subscribers;

charging information associated UE and/or AP subscribers; subscription information (e.g., data plane, data rates, subscriber class, traffic types, service information, etc.) for UE and/or AP subscribers, combinations thereof or the like.

Before detailing further features of communication system 100, certain contextual information is provided to understand characteristics of current Wi-Fi deployments. Such information is offered earnestly and for teaching purposes only and, therefore, should not be construed in a way to limit the broad applications and teachings of the present disclosure.

Broadband service providers have deployed millions of managed Wi-Fi APs (e.g., standalone, non-controller based) in, primarily residential, subscriber premises. These Wi-Fi APs are typically not placed in optimal locations (e.g., normally located where a broadband connection is available for a dwelling). Further, these APs are often deployed in unfriendly RF environments in which a large number of neighbors that are not provided by the service provider can be present. This can result in a fairly unstable set of neighbor for any given AP. This is a stark contrast to enterprise Wi-Fi deployments that are controller based, typically only number in the hundreds of APs, and unmanaged neighbors are less prevalent.

Thus, subscribers using residential Wi-Fi APs often have a poor Quality of Experience (QoE), which can lead to support calls, subscriber churn (e.g., turnover), and/or returns of equipment (e.g., APs) that can cost a service provider money, opportunity (e.g. Voice over Wi-Fi (VoWiFi) and Video services) and/or brand damage. Optimizing subscriber Wi-Fi experience is critical to the success of service providers. Strategies used in enterprise Wi-Fi environments are not applicable to residential environments due to the scale (e.g., millions not hundreds), the architecture (non-controller based), and the number of unmanaged neighbors that are can be present for residential deployments.

Embodiments described herein can overcome the aforementioned issues (and others) by providing a system and method via communication system 100 to facilitate wireless network optimizations for managed APs. In particular, the system and method solves the problem of centrally optimizing potentially millions of service provider managed Wi-Fi APs by reducing the problem into optimization groups comprising non-overlapping clusters of APs, referred to herein as 'RF clusters', that contain poor performers. A poor performing AP is referred to herein using the term 'outlier'. Centralized optimization is preferred for a number of cases over distributed optimization (at the AP) as wide scope and more information can be made available (e.g., about the neighbors, deployment environments, etc.) through centralized optimization. Further, by using non-overlapping RF Clusters and well defined pre and post-optimization evaluation time periods, the system and method described herein can provide a quantifiable mechanism to determine the success or failure of different optimization algorithms on manageable sets of Wi-Fi APs.

Most centralized RF optimization algorithms work on groups of APs that are either defined based on geography or based on the RF neighbor lists. Also, some RF optimization algorithms build AP groups dynamically based on the RF neighbor lists. However, none of them are focused on identifying optimizable Wi-Fi APs based on RF conditions and poor performance (e.g., QoE).

In accordance with various embodiments described here, various operations can be performed via optimization system 130, RRM 122, ACS 124 and/or subscriber database 126, to identify one or more non-overlapping cluster(s) of managed APs that contain poor performer(s) (e.g., outliers) for one or more optimization group(s) and to measure the success of optimization algorithm(s) that can be utilized to improve performance for cluster(s) of one or more of the optimization group(s). In at least one embodiment, an optimization group can identify a group of managed APs whose performance a service provider desires to optimize. In various embodiments, an optimization group can be defined as a group of managed APs deployed in a particular market (e.g., a region, zip code(s), city, suburb, neighborhood, building, arena, mall, etc.). In at least one embodiment, optimization system 130 can perform optimizations for multiple optimization groups and each can have different optimization goals.

Various wireless network optimization operations are discussed below with regard to optimizing performance for a particular optimization group say, for example, an optimization group comprising SP1 managed APs 104.1-104.5 within WLAN access network 110; however, it should be understood that optimization system 130 can perform wireless network optimizations across multiple optimization groups in parallel. RF interference can be caused in WLAN access network 110 by UEs and by APs that may be present in the access network.

In some instances APs can identify their neighbors through RF and/or IP scans of their environment. For a particular optimization iteration, for example, managed AP 104.1 can detect unmanaged AP 108.1, managed AP 104.2, managed AP 104.4 and other SP managed AP 106.3 as its neighbors, which can be included in a neighbor list for managed AP 104.1. Managed AP 104.2 can detect other SP managed APs 106.1 and 106.2 and managed AP 104.1 as its neighbors, which can be included in a neighbor list for managed AP 104.2. Managed AP 104.3 can detect other SP managed AP 106.2, unmanaged APs 108.1 and 108.2 and managed AP 104.4 as its neighbors, which can be included in a neighbor list for managed AP 104.2. Managed AP 104.4 can detect managed APs 104.1 and 104.3 and unmanaged AP 108.1 as its neighbors, which can be included in a neighbor list for managed AP 104.2. Managed AP 104.5 can detect other SP managed AP 106.3 and unmanaged AP 108.3 as its neighbors.

In various embodiments, managed APs 104.1-104.5 may or may not be able to determine whether their neighbors are also managed by a same service provider or not. Optimization system 130 can be configured to determine the managed APs that it is responsible for optimizing for a particular optimization group and can to determine whether other APs detected by managed APs are managed by other service providers or are unmanaged. In at least one embodiment, a database can be configured either internal to optimization system 130 or external to optimization system 130, which the optimization system can query to determine whether detected neighbor APs are managed or unmanaged. The database can identify APs by their BSSID or the like and can indicate the service provider for each AP identified. The potential interference caused by these neighbor APs and/or UEs in the system that optimization system 130 can seek to mitigate and/or overcome to improve performance of managed APs 104.5 and UEs connected thereto.

During operation, in at least one embodiment, optimization system 130 via RRM 122, ACS 124 and/or subscriber database 126 can gather data from SP1 managed APs 104.1-104.5 for the particular optimization group. For the particular optimization group for which performance improvements may be sought (e.g., managed APs 104.1-

104.5), optimization system 130 can gather data from the APs for an evaluation time period as may be configured for optimization system 130. An evaluation time period can define the time period during which the data is to be gathered from the APs of the particular optimization group. In various embodiments, gathered data can correspond to performance data (e.g., throughput, signal strength, errors, SSID overhead, signal interference, noise, etc.) and/or neighbor data, which can be learned from environment scans (e.g., RF scans, IP network scans, etc.) performed by managed APs of an optimization group.

In various embodiments, an evaluation time period can correspond to any of: a randomly selected number of minutes in a day, a particular number of minutes in the day or a periodically selected number of minutes in the day; one or more randomly selected days of a week, one or more particular days of the week or one or more particular days of the week that are evaluated periodically on a scheduled basis; one or more randomly selected months of a year, one or more particular months of the year or one or more particular months of the year that are evaluated periodically on a scheduled basis; combinations thereof or the like. In some embodiments, one or more evaluation time period(s) can be manually configured for an optimization system (e.g., optimization system 130). In some embodiments, one or more evaluation time period(s) can by dynamically configured by optimization system 130 itself based on operating (e.g., RF) conditions of a given WLAN, a number of optimization group(s) to be optimized, optimization(s) sought for one or more optimization group(s), combinations thereof or the like. In some embodiments, evaluation time periods can be configured differently for different optimization group(s) such that optimization system can actively manage optimizations for different group(s) at different time(s) in parallel. These examples are just a few example evaluation time periods and configurations that may be used in accordance with various embodiments of communication system 100 and are not meant to limit the broad scope of the teachings of the present disclosure. Virtually any other evaluation time periods and configurations can be provided using similar means and methods as those described herein and, thus, are clearly within the scope of the present disclosure.

Returning to the present operational example, using the gathered data, optimization system 130 can identify poor performers (e.g., outliers) for the particular optimization group through application of the gathered data to one or more metric function(s), referred to herein as cost or performance metric(s). Various performance metric(s) can be used to measure performance of the managed APs of the particular optimization group for the configured evaluation time period.

In some embodiments, performance metrics of APs for a particular optimization group can be ranked from worst to best or vice-versa in order to identify one or more outlier AP(s). In still some embodiments, average performance metrics of APs for a particular optimization group can be calculated over an evaluation time period and ranked to identify one or more outlier AP(s). In still some embodiments, a threshold level can be selected for a particular performance metric or average performance metric and can be used to identify outlier AP(s) based on whether an AP(s) performance satisfies the threshold level (e.g., is above or below the level, depending on the performance metric). In still some embodiments, a number of times that an AP's performance metric fails to satisfy one or more threshold levels for an evaluation time period can be counted and compared to one or more count threshold level(s) in order to identify one or more outlier AP(s). These examples are just a few examples of techniques that may be used in accordance with various embodiments of communication system 100 to identify outlier APs for an optimization group and are not meant to limit the broad scope of the teachings of the present disclosure. Virtually any other techniques can be provided using similar means and methods as those described herein and, thus, are clearly within the scope of the present disclosure.

Optimization system 130 can maintain a list of both outlier AP(s) and non-outlier AP(s) (e.g., any managed AP that is not identified as an outlier) identified for the particular optimization group. In various embodiments, performance metrics used to measure performance for one or more optimization group(s) can include, but not be limited to: beacon overhead, error rates, throughput, channel utilization and/or saturation, signal strength (e.g., UE and/or AP signal strength), combinations thereof or the like.

For each managed outlier AP identified for the particular optimization group, optimization system 130 creates a number of initial RF cluster(s) based on each outlier AP's neighbor list for the evaluation time period. An RF cluster can identify one or more managed outlier AP(s) and managed neighbor AP(s) detected by the outlier AP(s) and can be formed using the neighbor list(s) of each managed outlier AP(s). In some embodiments, an RF cluster can be a data structure in which each managed AP of the RF cluster can be identified using the BSSID or some other identifier assigned to each AP.

Initial RF cluster(s) created using outlier AP(s) may share overlapping managed AP neighbors. For example, in some instances, a neighbor list of a particular managed AP can include other AP(s) managed by the same service provider, AP(s) managed by other service provider(s) and/or unmanaged AP(s) detected by the particular managed AP. For purposes of embodiments described herein, each managed outlier AP identified for a given optimization group is to exist in only a single RF cluster for the group.

Thus, optimization system 130 can analyze neighbor lists of each outlier AP identified for each initial RF cluster created for the particular optimization group to validate that an outlier AP exists in only one RF cluster and, if not, optimization system 130 can merge RF clusters for any outlier APs that are identified in more than one RF cluster. The optimization system 130 can also merge RF clusters that share common managed neighbor AP(s) (outlier and/or non-outlier) to form optimized RF cluster(s). Thus, an RF cluster can include any combination outlier AP(s) and non-outlier AP(s). In some embodiments, a Received Signal Strength Indicator (RSSI) threshold (e.g., −84 dB or the similar) may be applied to other outlier neighbors detected by a given outlier AP to determine whether the other detected outliers are to be included in the RF cluster for the given outlier AP.

In at least one embodiment, creating non-overlapping RF clusters created using outlier APs is important because doing so can help to ensure that any optimizations that are made do not affect other managed APs (e.g., APs that are performing well), can provide mechanisms for optimization algorithms to fix RF interference issues by accounting for all poor performers AP(s) in a particular RF cluster, and can allows for scale using parallelism.

Once the optimization system 130 validates that each outlier AP exists in only one RF cluster and optimized RF cluster(s), if any, are formed, the optimization system 130 can 'lock' the RF cluster(s) such that no more RF cluster(s)

can be formed and/or optimized for an optimization time period. In at least one embodiment, the optimization time period is greater than or equal to the evaluation time period. Since the neighbor list of a given AP can change dynamically over a period of time (e.g., as new APs are detected and/or no longer detected), locking the optimized RF cluster(s) allows for quantifiable comparisons to be determined between pre- and post-optimization conditions.

Once the optimized RF cluster(s) are locked, one or more optimization parameter(s) can be applied to one or more managed AP(s) of each RF cluster. Optimization system 130 can identify one or more optimization parameter(s) that are to be applied to one or more on or more AP(s) for each of one or more RF cluster(s) for each of one or more evaluation time period(s) that are to be analyzed for of the particular optimization group. Different types of optimization parameters that can be applied to one or more AP(s) that the AP(s) are to use for a particular evaluation time period will be discussed in further detail herein, below, and can include: a transmission (Tx) power value or Tx power range that is to be used by a managed AP; a communication channel number or a particular combination of communication channel numbers that are to be used by a managed AP; a communication channel band or combination of communication channel bands that are to be used by a managed AP; a communication frequency or range of communication frequencies that are to be used by a managed AP; a bit rate value or bit rate range that is to be used by a managed AP; or any combination thereof in accordance with various embodiments described herein.

In addition to identifying one or more optimization parameter(s) to apply, optimization system 130 can also identify the one or more managed AP(s) to which the optimization parameter(s) are to be applied. In various embodiments, one or more outlier AP(s) may be identified to have optimization parameter(s) applied thereto, one or more non-outlier AP(s) may be identified to have optimization parameters applied thereto or any combination thereof. In various embodiments, optimization system 130 can identify one or more managed AP(s) of one or more cluster(s) of a particular optimization group to which one or more optimization parameter(s) are to be applied for one or more evaluation time period(s) based on various optimization algorithms that may be used for corresponding types of performance for which improvements may be sought and/or subscriber priority, which can include any combination of UE and/or managed AP priority.

In various embodiments, optimization system 130 can determine and store a pre-optimization state for all managed AP(s) of the particular optimization group or can store a pre-optimization state only for managed AP(s) to which optimization parameter(s) are to be applied for a particular evaluation time period. The pre-optimization state can identify operating parameters (e.g., channel information, Tx power, bit rate(s), etc.) set for the AP(s) prior to any optimization parameter(s) being applied to one or more identified AP(s) for the particular optimization group. Optimization system 130 can query RRM 122 and/or ACS 124 to gather operating parameters of the managed APs 104.1-104.5 of the particular optimization group.

Optimization system 130 via RRM 122 and/or ACS 124 can apply the optimization parameters to the one or more identified AP(s) for a particular evaluation time period. Once the managed AP(s) are identified and the optimization parameter(s) are applied thereto, data can be gathered for the all the managed AP(s) 104.1-104.5 of the particular optimization group and can be analyzed using one or more performance metric(s) for another evaluation time period. In various embodiments, gathered data can be analyzed concurrently as it is being gathered during an evaluation time period, during an optimization time period after the data is gathered (e.g., for embodiments in which the optimization time period is greater than the evaluation time period), or any combination thereof. In some embodiments, historical performance data for an optimization group can be stored for multiple evaluation time periods and analyzed in conjunction with current data gathered for the optimization group and/or analyzed at another time.

Following data gathering and potential analysis that may be performed in parallel, for the particular evaluation time period, optimization system 130 can measure the success and/or failure of the one or more attempted optimizations by recalculating the performance metrics for all the managed APs. Subsequent optimization(s) can be made for managed APs 104.1-104.5 of WLAN access network 110 by performing subsequent optimization iterations that can generally include: gathering data for the managed APs, identifying outlier AP(s), forming and optimizing RF cluster(s), identifying optimization parameter(s) to apply; identifying AP(s) to which to apply the parameter(s); gathering more data; and measuring improved or degraded performance for the various optimization(s) made for managed APs 104.1-104.5. As discussed for various embodiments described herein, other operations can be performed for various optimization iterations in addition to the general gathering data; identifying, forming and optimizing RF cluster(s) associated with outlier(s); identifying optimization parameter(s) and identifying AP(s) to which to apply the parameter(s); gathering more data and measuring success of failure of various optimizations.

In some instances, the optimization system 130 may determine that application of optimization parameter(s) has caused degraded performance for one or more AP(s) for which improvements had been sought (e.g., to which optimization parameter(s) had been applied for a previous evaluation time period). In some embodiments, optimization system can store a pre-optimization state for various AP(s) in order to 'roll-back' or otherwise reset operational parameters to a pre-optimization state for any AP(s) that experienced degraded performance from the performance as was measured for the AP(s) prior to the optimization parameter(s) being applied.

As noted above, the operations described herein can be applied across multiple optimization groups in parallel for different markets that may be defined for the communication system. Accordingly, the system and method provided by communication system 100 provides an optimization solution in which non-overlapping group(s) of managed Wi-Fi APs can be centrally optimized in parallel allowing the solution to be scaled to provide optimizations for potentially millions of managed Wi-Fi APs. Further, the system and method provided by communication system 100 also provides a quantifiable technique to determine the success and/or failure of different optimization algorithms that may be utilized to attempt to improve performance of managed Wi-Fi APs.

Referring again to FIG. 1B, optimization system 130 can include one or more processor(s) 131, one or more memory element(s) 132, storage 133, network interfaces 134, a bus 135, control logic 136 and a number of instance(s) of optimization group logic 137.1-137.N in which each instance of optimization group logic can include an instance of cluster management logic 138.1 and a number of instance(s) of optimizer logic 139.1.1-139.1.M-139.N.1-139.N.M.

As noted previously, the number of instance(s) of optimization group logic 137.1-137.N that may be dynamically instantiated during operation of communication system 100 can be based on a number of optimization groups that optimization system 130 is optimizing in which an optimization group logic instance can be instantiated for each optimization group that optimization system 130 is responsible for optimizing. The number of instance(s) of optimizer logic that may be dynamically instantiated during operation of communication system 100 for a given instance of optimization group logic can based on a number of Radio Frequency RF cluster(s) identified for a particular optimization group and can change across multiple optimization iterations. Each optimization group logic instance 137.1-137.N can have its own associated number of instance(s) of optimizer logic instantiated during operation.

In at least one embodiment, processor(s) 131 is/are at least one hardware processor configured to execute various tasks, operations and/or functions for optimization system 130 as described herein according to software and/or instructions configured for the optimization system. In at least one embodiment, memory element(s) 132 and/or storage 133 is/are configured to store data, information, software, instructions and/or logic associated with optimization system 130 (e.g., data structures, logic, etc. can, in various embodiments, be stored using any combination of memory element(s) 132 and/or storage 133).

In various embodiments, network interfaces 134 can enable communication between optimization system 130 and other network elements that may be present in communication system 100 to facilitate operations as discussed for various embodiments described herein. In various embodiments, network interfaces 134 can be provisioned to support one or more communication protocols, routing protocols, etc., one or more Ethernet driver(s) and/or controller(s), Fibre Channel driver(s) and/or controller(s) or other similar protocols, network interface driver(s) and/or controller(s) to enable communications for optimization system 130 within communication system 100.

In at least one embodiment, bus 135 can be configured as an interface that enables one or more elements of optimization system 130 (e.g., processor(s) 131, memory element(s) 132, logic, interfaces, etc.) to communicate in order to exchange information and/or data. In at least one embodiment, bus 135 may be implemented as a fast kernel-hosted interconnect, potentially using shared memory between processes (e.g., logic, etc.), which can enable efficient communication paths between the processes.

In various embodiments, control logic 136 can include instructions that, when executed (e.g., via one or more processor(s) 131), cause optimization system 130 to perform operations, which can include, but not be limited to, providing overall control operations of optimization system 130; instantiating or removing one or more instance(s) of optimization group logic 137.1-137.N depending on the number of optimization group(s) to be optimized by optimization system 130; cooperating or otherwise interacting with optimization group logic 137.1-137.N and each instance of cluster management logic as well as each instance of optimization logic instantiated for each group; interacting with RRM 122, ACS 124 and/or subscriber database 126 to perform operations (e.g., gathering data, gathering and storing pre-optimization state(s) for one or more managed AP(s); applying optimization parameter(s) to one or more managed AP(s), etc.); maintaining or otherwise interacting with stored data, information, parameters, etc. (e.g., memory element(s), storage, data structures, databases, tables, etc.); combinations thereof or the like to facilitate various operations as discussed for various embodiments described herein.

Example details associated with optimization group logic is discussed in reference to the optimization group logic 137.1 instance; however, it should be understood that the example details can be applied to any instance of optimization group logic that may be instantiated during operation of communication system 100. In various embodiments, an instance of optimization group logic (e.g., optimization group logic 137.1) can include instructions that, when executed (e.g., by one or more processor(s) 131), cause optimization system 130 to perform operations associated with Wi-Fi network optimizations as discussed for various embodiments described herein including, but not limited to: cooperating or otherwise interacting with an instance of cluster management logic (e.g., cluster management logic 138.1 instance) instantiated for the optimization group logic instance to perform one or more operations; cooperating or otherwise interacting with one or more instance(s) of optimizer logic (e.g., optimizer logic instances 139.1.1-139.1.M) that may be instantiated for the optimization group logic instance to perform one or more operations; cooperating or otherwise interacting with control logic 136 to perform various operations; gathering data for one or more managed AP(s); storing gathered data; applying optimization parameter(s) to one or more identified AP(s); maintaining or otherwise interacting with stored data, information, parameters, etc. (e.g., memory element(s), storage, data structures, databases, tables, etc.); combinations thereof or the like to facilitate various operations as discussed for various embodiments described herein.

In various embodiments, an instance of cluster management logic (e.g., cluster management logic 138.1) can include instructions that, when executed, cause optimization system 130 to perform operations associated with Wi-Fi network optimizations as discussed for various embodiments described herein including, but not limited to: cooperating or otherwise interacting with an instance of optimization group logic (e.g., optimization group logic 137.1 instance) instantiated for an optimization group to perform one or more operations; cooperating or otherwise interacting with one or more instance(s) of optimizer logic (e.g., optimizer logic instances 139.1.1-139.1.M) that may be instantiated for the optimization group logic instance to perform one or more operations; cooperating or otherwise interacting with control logic 136 to perform various operations; identifying managed outlier AP(s) for the optimization group, identifying initial RF cluster(s) for the outlier AP(s) and forming optimized RF cluster(s), if possible, and instantiating optimizer logic instance(s) for each RF cluster to perform various optimization operations for each optimization iteration; maintaining or otherwise interacting with stored data, information, parameters, etc. (e.g., memory element(s), storage, data structures, databases, tables, etc.); combinations thereof or the like to facilitate various operations as discussed for various embodiments described herein.

In various embodiments, an instance of optimizer logic can include instructions that, when executed, cause optimization system 130 to perform operations associated with Wi-Fi network optimizations as discussed for various embodiments described herein including, but not limited to: cooperating or otherwise interacting with an instance of optimization group logic (e.g., optimization group logic 137.1 instance) instantiated for an optimization group to perform one or more operations; cooperating or otherwise interacting instance of cluster management logic that may be instantiated for the optimization group logic instance to perform one or more operations; cooperating or otherwise interacting with one or more other instance(s) of optimization logic for the optimization group to perform one or more operations (e.g., to identify which AP(s) are to received optimization parameter(s) for a particular optimization iteration, since different AP(s) may be identified based on the parameter(s) to be applied, the optimization algorithm, etc.); cooperating or otherwise interacting with control logic 136 to perform various operations; identifying optimization parameter(s) to apply for a particular optimization iteration; identifying one or more AP(s) to which parameter(s) are to be applied; maintaining or otherwise interacting with stored data, information, parameters, etc. (e.g., memory element(s), storage, data structures, databases, tables, etc.); combinations thereof or the like to facilitate various operations as discussed for various embodiments described herein.

Figure 2A:
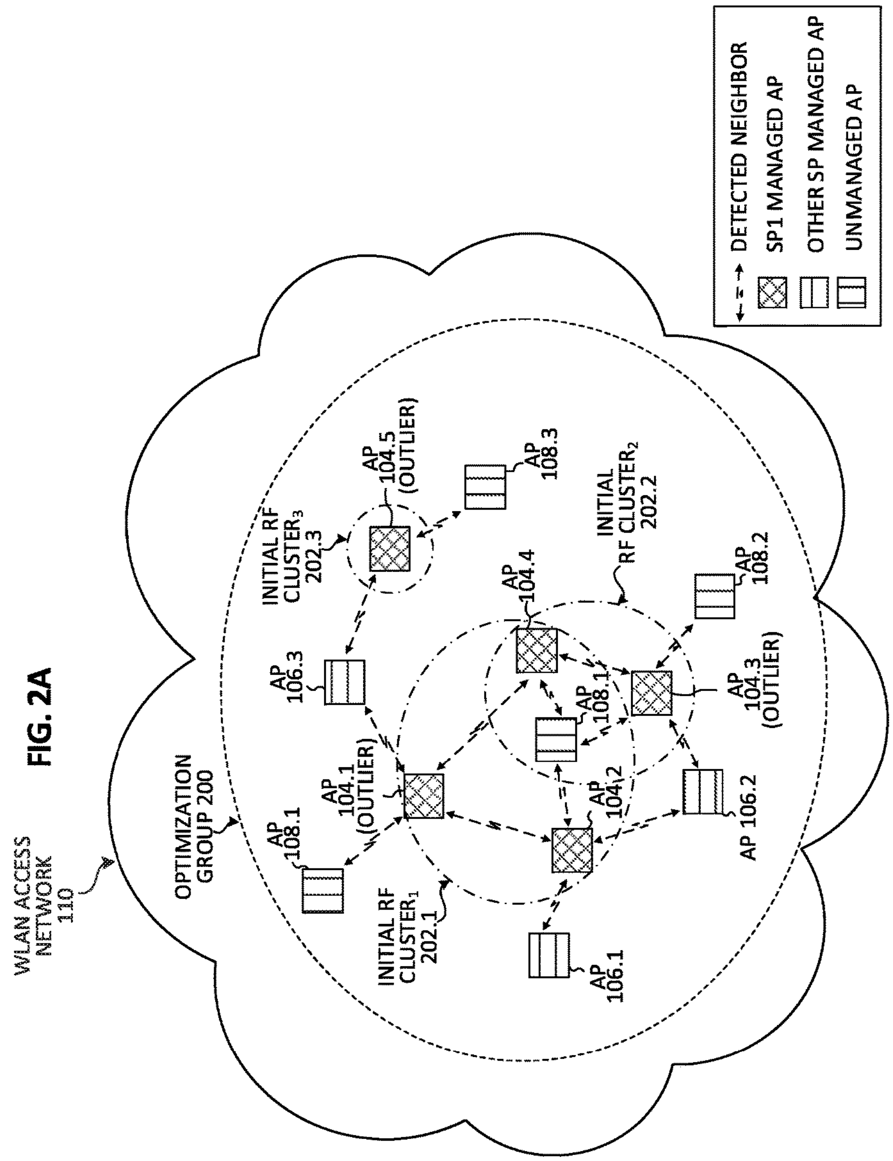
FIGS. 2A-2B are simplified block diagrams illustrating example details associated with an access network in accordance with one potential embodiment of the communication system.
Figure 2B:
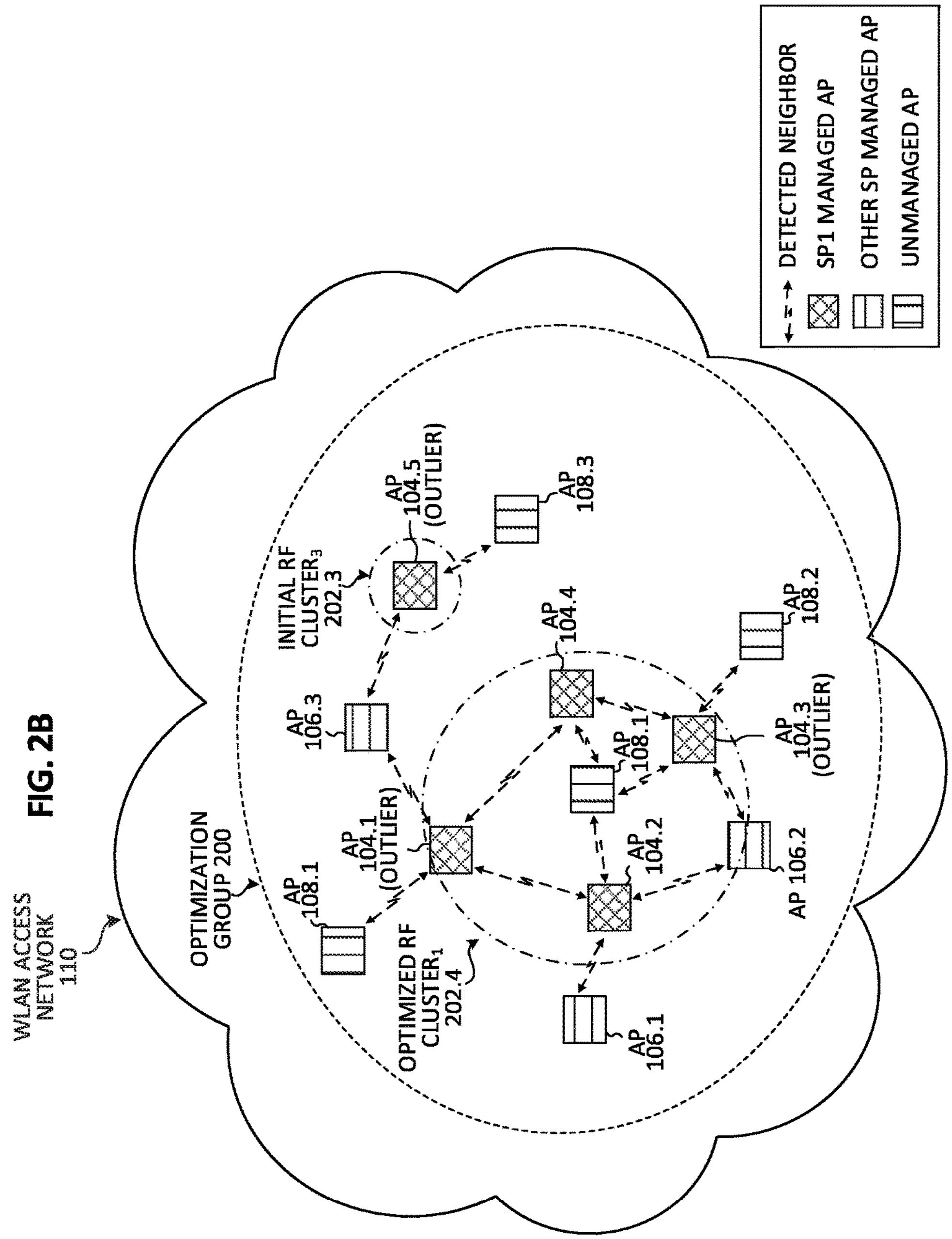

Referring to FIGS. 2A-2B, FIGS. 2A-2B are simplified block diagrams illustrating example details that can be associated with WLAN access network 110 of communication system 100 in accordance with one potential embodiment. In particular, FIGS. 2A-2B illustrate example details related RF clustering operations that may be performed by optimization system 130 in accordance with one potential embodiment. FIGS. 2A-2B include WLAN access network 110, Wi-Fi APs 104.1-104.5 managed by SP1, Wi-Fi APs 106.1-106.3 managed by other service provider(s) and unmanaged Wi-Fi APs 108.1-108.3. No UEs are shown for the embodiment of FIGS. 2A-2B in order to illustrate other example details that can be associated with WLAN access network 110 of communication system 100.

For the embodiment of FIGS. 2A-2B, it is assumed for illustrative purposes only, that various managed outlier APs have been identified by optimization system 130 (e.g., via cluster management logic, etc.) for a particular optimization iteration of an optimization group 200 that includes managed Wi-Fi APs 104.1-104.5. For the embodiment of FIGS. 2A-2B, it can be assumed that managed AP 104.1, managed AP 104.3 and managed AP 104.5 have been identified as outlier APs while managed AP 104.2 and managed AP 104.4 are identified as non-outlier APs based on data gathered for the managed APs for a previous evaluation time period, performance metrics calculated using the data and one or more performance algorithms and the like as discussed for various embodiments described herein.

As illustrated in the embodiment FIG. 2A, an initial RF $\text{cluster}_1$ 202.1 can be identified for outlier AP 104.1 that includes outlier AP 104.1 and detected neighbor managed APs 104.2 and 104.4 that are identified in a neighbor list for outlier AP 104.1. Another initial RF $\text{cluster}_2$ 202.2 can be identified for outlier AP 104.3 that includes outlier AP 104.3 and detected neighbor managed AP 104.4 that is identified in a neighbor list for outlier AP 104.3. Another initial RF $\text{cluster}_3$ 202.3 can be identified for outlier AP 104.5; because outlier AP 104.5 has no detected neighbor managed APs identified in its neighbor list, RF $\text{cluster}_3$ 202.3 includes only outlier AP 104.5.

As illustrated in the embodiment of FIG. 2B, optimization system 130 can identify that a shared managed neighbor AP (managed AP 104.4) is identified for both initial RF $\text{cluster}_1$ 202.1 for outlier AP 104.1 and for initial RF cluster2 102.2 for outlier AP 104.2. Therefore, the initial RF clusters can be merged by optimization system 130 to perform an optimized RF $\text{cluster}_1$ 202.4 that identifies outlier AP 104.1, outlier AP 104.3 and the detected managed AP neighbors of each outlier (e.g., managed (non-outlier) AP 104.2 and managed (non-outlier) AP 104.4) for the particular optimization iteration. As no managed neighbor APs are detected by outlier AP 104.5, the initial RF $\text{cluster}_3$ 102.3 for outlier AP 104.5 remains unchanged for the particular optimization iteration.

Once the clusters are optimized for the particular optimization iteration, optimized RF $\text{cluster}_1$ 202.4 and initial RF $\text{cluster}_3$ 202.3 can be locked by optimization system 130 in order to determine optimization parameter(s) for one or more optimization algorithms, identify managed AP(s) to which the parameter(s) are to be applied, apply the parameter(s) to the identified AP(s), gathering data, etc. for a subsequent evaluation time period optimization iteration. It should be understood that the example RF clusters illustrated for the embodiments of FIGS. 2A-2B are provided for illustrative purposes only as may be determined for a particular optimization iteration and are not meant to limit the broad scope of the present disclosure. As discussed for various embodiments described herein, identification of managed APs as being outliers or non-outliers can change for each optimization iteration performed for communication system 100.

Referring to FIG. 3, FIG. 3 is a simplified flow diagram illustrating example operations 300 that can be performed to facilitate wireless network optimizations in accordance with one potential embodiment. In particular, operations 300 can be associated with operations that can be performed for a particular optimization iteration via an optimization system 130 (e.g., optimization system 130) in accordance with one potential embodiment. In at least one embodiment, operations 300 can be performed by optimization system 130 in cooperation with managed APs 104.1-104.5 and one or more of RRM 122, ACS 124 and/or subscriber database 126.

At 302, the operations can include optimization system 130 gathering operational data for a plurality of APs for an optimization group that are managed by a same service provider (e.g., managed APs 104.1-104.5). The data can be gathered for an evaluation time period. In various embodiments, the data can be gathered from RRM 122, ACS 124 and/or subscriber database 125. For example, managed APs 104.1-104.5 can interact with RRM 122 and/or ACS 124 to report operational information, by time of day, associated with the APs including, but not limited to, measurement reports (e.g., connected AP and/or neighbor AP RSSI measurement(s), etc.) received from UE connected to each managed AP, measurements made by the managed APs themselves (e.g., RSSI of detected neighbor(s), packet decoding errors, etc.), usage and total number of packets, channel utilization, combinations thereof, or the like.

At 304, the operations can include optimization system 130 determining one or more optimization parameter(s) to apply to one or more AP(s) of each the RF cluster(s). In various embodiments, the determining at 304 can be based on the optimization algorithm to be utilized by optimization system 130 for a particular optimization iteration. In some embodiments, an ordered list of optimization parameter types (e.g., first channel number(s) are optimized, then Tx power(s) are optimized, then bit rate(s), etc.) can be configured for optimization system 130 that the system is to utilize to attempt optimize performance one or more optimization groups.

In still some embodiments, optimization parameters learned by and/or configured for optimization system 130 can be used to identify one or more optimization parameters that the system is to utilize to attempt to optimize performance for an optimization group based on performance metrics calculated for each AP and/or the optimization algorithm to be utilized for a particular optimization iteration. For example, if an optimization group includes managed APs having UE connected thereto that are geographically static (e.g., smart TVs, desktop PCs, thermostats, etc.) and report weak received AP signal strength, then changing Tx power and/or bit rate(s) could cause such a UE to lose connection; thus, optimization parameters involving Tx power and/or bit rate could be eliminated from a list of potential optimization parameters that optimization system 130 may consider utilizing in its attempts to optimize performance for the optimization group.

In still some embodiments, optimization parameters may be predicted by optimization system 130 based on historical data gathered for an optimization group. For example, optimization system 130 can track the impact of various optimization parameters applied to an optimization group for various evaluation time periods in order to identify optimization parameters that will most likely lead to improved performance for the optimization group for one or more current or future time periods. These examples are just a few examples that may be used to identify one or more optimization parameter(s) to apply to one or more managed AP(s) in accordance with various embodiments of communication system 100 and are not meant to limit the broad scope of the teachings of the present disclosure. Virtually any other means or methods can be used to identify one or more optimization parameter(s) to apply to one or more managed AP(s) using similar means and methods as those described herein and, thus, are clearly within the scope of the present disclosure.

At 306, the operations can include optimization system 130 calculating performance metrics for the plurality of managed APs based on the optimization parameters are to be optimized for the particular optimization iteration. In various embodiments, the performance metrics can relate to beacon overhead, error rates, throughput, channel utilization and/or saturation, signal strength (e.g., UE and/or AP signal strength), combinations thereof or the like as discussed for various embodiments described herein. In some embodiments, optimization system 130 can store historical performance metrics for the plurality of APs to measure improved or degraded performance across various optimization iterations.

At 308, the operation can include optimization system determining one or more managed outlier AP(s) based on the performance metrics. At 310, the operations can include optimization system 130 identifying a cluster to which each identified outlier AP belongs. The identifying at 308 can include the optimization system identifying an initial RF cluster to which each outlier belongs (e.g., an outlier and its managed neighbors) and forming optimized RF cluster(s), if possible, (e.g., for outliers that share common managed neighbors and to ensure that each outlier AP exists in only one RF cluster). Other neighbor AP(s) can be detected by managed APs but may not be considered as part of an RF cluster identified for a given managed AP. In some embodiments, optimization system 130 can assign an RF cluster ID to each RF cluster identified for a given optimization iteration. In some embodiments, optimization system can assign an outlier ID to each outlier AP for each RF cluster.

At 312, the operations can include optimization system 130 identifying one or more managed AP(s) for one or more RF clusters for the optimization group. In various embodiments, optimization system 130 can identify one or more managed AP(s) of one or more cluster(s) of a particular optimization group to which one or more optimization parameter(s) are to be applied for one or more evaluation time period(s) based on one or more factors including: the performance metrics calculated for each managed AP; the optimization algorithm(s) that may be utilized for different types of performance for which improvements may be sought; and/or subscriber priority, which can include any combination of UE and/or managed AP priority as discussed in further detail herein, below.

In at least one embodiment, a priority level or value can be determined for one or more subscribers. Subscriber priority values can be used to temper the application of optimization parameter(s) to one or more managed APs. For example, in some embodiments, outlier APs may be determined to be associated with low priority subscribers, in which instances improving the performance of such low priority APs may not be desired at the expense of degrading performance of APs associated with higher priority subscribers. There are limits to WiFi optimization (e.g., in 2.4 GHz band there are only 3 non-overlapping channels). Often optimizing one AP will result in negatively impacting another. Channel airtime is a finite resource. Additionally, not all subscribers are equal. Some subscribers may premium service subscriptions or some may be associated with heavy data users while others rarely access their service. Finally, some subscribers can be more vocal than others and can raise more than their share of support tickets. In effect, can subscribers require differing amounts of channel air time to satisfy their service expectations. Thus, identification of one or more managed AP(s) to which one or more optimization parameter(s) are to be applied can be subjected to subscriber priority conditions that may be used in identifying one or more managed AP(s) to which optimization parameter(s) are to be applied.

In at least one embodiment, optimization system 130 can collect a subscriber value per managed AP from subscriber database 126. A subscriber value can be a numeric value attributed to each subscriber by the service provider (e.g., SP1) based on a number of provider defined factors that can affect the Service Level Agreement (SLA) that each subscriber has been promised for their subscription (e.g., Very Important Person (VIP) customer, video customer VoWiFi customer, highly loyal customer, etc.). For each managed AP, optimization system can calculated and store a numeric priority or service expectation value for the evaluation time period. The priority value can be calculated as a, potentially weighted, combination of one or more priority parameters in combination with the subscriber value assigned to the subscriber of an AP by the service provider. Once a priority value is calculated for each managed AP, the APs can be categorized into different priority buckets groups (e.g., a low priority group, a medium priority group and a high priority group). In some embodiments, APs in lower priority group(s) can be identified to have optimization parameter(s) applied thereto that degrade the performance of the lower priority APs and APs in higher priority group(s) can be identified to have optimization parameter(s) applied thereto that improve their performance. Since there are limited RF resources that can be shared by APs in an RF cluster, the higher priority APs can be optimized at the expense of lower priority APs in some embodiments.

In various embodiments, priority parameters can include, but not be limited to any combination of: (a) a total data usage for each outlier AP for an evaluation time period during which data is collected for each of a plurality of APs; (b) a total number of mobile user equipment served by each outlier AP; (c) a total number of static user equipment served by each outlier AP; (d) a total active time per day for each outlier AP for an evaluation time period during which data is collected for each of the plurality of APs; (e) a total amount of one of Voice over WiFi (VoWiFi) usage and video usage for each outlier AP; (f) historical priority parameters associated with one or more of: (a), (b), (c), (d) and (e), wherein the historical priority parameters can be associated with a time period less than or equal to one previous year for which the priority parameters data have been collected; and/or (g) a subscriber value for each outlier AP, wherein the subscriber value for each outlier AP is assigned by the service provider. These examples are just a few examples of priority parameters that may be used in accordance with various embodiments of communication system 100 to identify APs for an optimization group that are to which certain optimization parameters are to be applied and are not meant to limit the broad scope of the teachings of the present disclosure. Virtually any other parameters can be provided using similar means and methods as those described herein and, thus, are clearly within the scope of the present disclosure.

Returning to the embodiment of FIG. 3, at 314, the operations can include optimization system 130, via RRM 122 and/or ACS 124 applying the one or more identified (310) optimization parameter(s) to the one or more identified (312) managed AP(s) for one or more RF clusters and the operations can return to 302 at which optimization system 130 gathers additional data for the optimization group for another evaluation time period and the operations can be repeated. In some embodiments, applying optimization parameters can include removing certain parameters from a list of potentially usable parameters (e.g., PHY bit rates) that may be used by a particular managed AP.

In various embodiments, one or more advantages can be realized for Wi-Fi network optimizations facilitated by communication system 100 over traditional techniques of optimizing Wi-Fi APs based only on geographical areas. In at least one embodiment, one advantage that can be realized for Wi-Fi network optimizations facilitated by communication system 100 can include providing for the capability to identify the highest priority Wi-Fi APs to address (e.g., by providing for the ability to find highest number of poor performers for within an optimization group). In at least one embodiment, one other advantage that can be realized for Wi-Fi network optimizations facilitated by communication system 100 can include providing techniques through which different optimization algorithms can be used to fix RF interference issues by accounting for all poor performers APs in an RF cluster. In at least other embodiment, one other advantage that can be realized for Wi-Fi network optimizations facilitated by communication system 100 can include providing a quantifiable technique to determine the success and/or failure of different optimization algorithms that may be utilized to attempt to improve performance of managed Wi-Fi APs for one or more optimization group(s).

Referring to FIG. 4, FIG. 4 is a simplified flow diagram illustrating other example operations 400 that can be performed to facilitate performing wireless network optimizations in accordance with one potential embodiment. In particular, operations 400 can be associated with operations that can be performed following the gathering of data from a plurality of managed APs of an optimization group (e.g., managed APs 104.1-104.5) and determining one or more optimization parameter(s) to optimize (e.g., apply) for a particular evaluation time period (e.g., as shown at 302 and 304 for the embodiment of FIG. 3) of a particular optimization iteration performed via an optimization system (e.g., optimization system 130) in accordance with one potential embodiment. In at least one embodiment, operations 400 can be performed by optimization system 130 in cooperation with managed APs 104.1-104.5 and one or more of RRM 122, ACS 124 and/or subscriber database 126.

At 402, the operations can include optimization system 130 calculating and storing performance metrics for each of the plurality of managed APs for the evaluation time period. In some embodiments, optimization system 130 can index each AP's performance metric for an evaluation time period such that it can be easily retrieved for post-optimization analysis.

At 404, the operations can include optimization system 130 identifying one or more managed AP(s) to which one or more optimization parameter(s) are to be applied. Operations 404 can include identifying outlier AP(s) and creating and optimizing RF cluster(s) for the outlier AP(s) (e.g., as discussed for 308 and 310 for the embodiment of FIG. 3). At 406, the operations can include optimization system 130 storing a pre-optimization state for each of one or more managed AP(s) to which one or more optimization parameter(s) are to be applied. In some embodiments, operations at 404 can be based on subscriber priority factors, as discussed above. In at least one embodiment, a particular pre-optimization state stored for a particular managed AP can identify operational parameters (e.g., channel(s), Tx power(s), band(s), bit rate(s), etc.) as may be set for the particular managed AP prior to the optimization parameter(s) being applied for the particular optimization iteration.

At 408, the operations can include optimization system 130, via RRM 122 and/or ACS 124 applying the one or more identified (310) optimization parameter(s) to the one or more identified (312) managed AP(s) for one or more RF clusters. At 410, the operations can include optimization system 130 gathering operational data for the plurality of managed APs for the optimization group for an evaluation time period. At 412, the operations can include optimization system 130 calculating new performance metrics for the plurality of managed APs based on the gathered (410) operational data. As discussed herein, performance metrics can, in some embodiments, be calculated in parallel with gathering data for managed APs.

At 414, optimization system 130 can compare the new performance metrics to the stored (402) performance metrics for each AP to measure improved or degraded performance for the managed APs for the particular optimization iteration. At 416, optimization system 130 can determine whether any AP(s) to which optimization parameter(s) were applied for the particular optimization iteration experienced degraded performance. Based on a determination at 416 that one or more AP(s) experienced degraded performance, the operations can continue to 418 at which the optimization system 130, via RRM 122 can reset one or more operational parameter(s) for the respective AP(s) that experienced degraded performance back to each of their respective pre-optimization state(s) and the operations can return to 404 at which subsequent operations for another optimization iteration can be performed. Based on a determination at 416 that no AP(s) experienced degraded performance, the operations can simply return to 404 at which subsequent operations for another optimization iteration can be performed.

Referring to FIG. 5, FIG. 5 illustrates example clustering operations 500 that that can be performed by optimization system 130 to facilitate wireless network optimizations in accordance with one potential embodiment. In particular, operations 500 can be associated with clustering operations that can be performed following the gathering of data from a plurality of managed APs of an optimization group (e.g., managed APs 104.1-104.5) and the determining of one or more optimization parameter(s) to optimize for a particular evaluation time period (e.g., as shown at 302 for the embodiment of FIG. 3) of a particular optimization iteration performed via an optimization system (e.g., optimization system 130) in accordance with one potential embodiment. In at least one embodiment, operations 500 can be performed by optimization system 130 in cooperation with managed APs 104.1-104.5 and one or more of RRM 122, ACS 124 and/or subscriber database 126

At 502, the operations can include optimization system 130 calculating performance metrics associated with one or more optimization parameters for each managed AP (e.g., managed APs 104.1-104.5) for the particular optimization iteration. At 504, the operations can include optimization system 130 identifying one or more outlier AP(s) based on the calculated performance metrics (e.g., based on counts, ranking, threshold comparisons, etc.). At 506, the operations can include optimization system 130 forming an RF cluster (e.g., an initial RF cluster) for each identified outlier AP. The RF cluster formed for each outlier AP can be a list identifying the outlier AP and its detected neighbors.

At 508, the operations can include optimization system 130 determining whether any managed outlier AP is identified in more than one RF cluster. Based on a determination at 508, that a particular outlier AP is identified in more than one RF cluster, the optimization system can merge (510) all RF clusters in which the particular AP is identified and the operations can return to 508 to determine whether any other outlier APs are identified in more than one RF cluster. Operations 508 and 510 can be repeated until each outlier AP is identified in only one RF cluster.

Based on a determination at 508 that no outlier AP(s) are identified in more than one RF cluster, the operations can continue to 512 at which the optimization system 130 can determine whether any managed neighbors AP(s) (as detected by each outlier AP) are identified in more than one RF cluster. Based on a determination at 512 that a particular managed neighbor AP is identified in more than one RF cluster, the optimization system can merge (514) all RF clusters in which the particular managed neighbor AP is identified and the operations can return to 512 to determine whether any other managed neighbors are identified in more than one RF cluster. Operations 512 and 514 can be repeated until each (detected) managed neighbor AP is identified in only one RF cluster.

Based on a determination at 512 that no managed neighbor APs are identified in more than one RF cluster the clustering operations can end and other operations that may be associated with the particular optimization can be performed as discussed for various embodiments described herein. Accordingly, optimization system can provide RF clustering operations that ensure that outlier APs and their detected neighbors grouped into non-overlapping RF clusters.

Referring to FIG. 6, FIG. 6 illustrates yet other example operations 600 that that can be performed to facilitate wireless network optimizations in accordance with one potential embodiment. In particular, operations 600 can be associated with operations that can be performed to facilitate channel optimizations for a WLAN access network (e.g., WLAN access network 110), which may improve SSID overhead for managed APs for a particular optimization group. In at least one embodiment, operations 600 can be performed by optimization system 130 in cooperation with managed APs 104.1-104.5 and one or more of RRM 122, ACS 124 and/or subscriber database 126.

In general, SSID overhead as discussed herein can relate to a percent of time that managed APs spend decoding Wi-Fi beacon frames received from neighboring APs. Beacon frames can be referred to herein more generally as beacons. The time spent decoding Wi-Fi APs can affect the overall time that a given managed AP can spend performing data transmissions to its own UE. For example, an AP that spends 40% of its time decoding Wi-Fi beacons from neighboring APs may have 60% or less time to spend performing data transmissions. Channel utilization and/or throughput can be degraded for channels in which many Wi-Fi beacons are being transmitted. By improving SSID overhead, it is meant that optimization system 130 can configure managed APs to utilize communication channels on SSID overhead is reduced.

In one embodiment, operations 600 can be performed following the gathering of data from a plurality of managed APs of an optimization group (e.g. managed APs 104.1-104.5) for a particular evaluation time period of a particular optimization iteration. At 602, the operations can include calculating an SSID overhead performance metric for each managed AP 104.1-104.5. In some embodiments, an SSID overhead performance metric can be calculated using the number of SSIDs reported by a given managed AP for all channels utilized by the AP and the PHY bit rate(s) used by the AP for the evaluation time period. In at least one embodiment, the calculation can include performing a table lookup that identifies SSID overhead percentages for various bit rates, channels, and/or frequencies based the number of detected APs present for an RF cluster.

At 604, the operations can include identifying managed outlier AP(s). At 606, the operations can include forming and RF cluster for each managed outlier AP(s) and merging (608) RF cluster(s), if needed. Once the optimization system 130 creates and merges RF cluster(s), the optimization system can perform iterative operations (610) for each RF cluster. The iterative operations (610) can include, for a given RF cluster, creating (612) a histogram of managed SSIDs to channel number; creating (614) a histogram of unmanaged SSIDs to channel number; creating (616) a histogram of managed APs to priority based on a priority level determined for each managed AP; balancing (618) channel assignments for the RF cluster so that high priority AP(s) are on channel(s) having the fewest SSIDs and low priority AP(s) are on channel(s) having the most SSIDs; and applying (620) the channel assignments to each managed AP for the RF cluster. Once all managed APs for each RF cluster are considered using the iterative operations (610), the operations can end.

In at least one embodiment, the balancing at 618 can include making temporary channel assignments for each managed AP of an RF cluster and then predicting the resulting SSID overhead for each managed AP. The balancing at 618 can be performed iteratively based on different assignments and predicted results until a desired balance is achieved. In at least one embodiment, the balancing can be performed until a desired threshold number or threshold percent of high priority AP(s) are assigned to channel(s) having the fewest SSIDs as compared to low priority AP(s).

Referring to FIG. 7, FIG. 7 illustrates yet other example operations 700 that that can be performed to facilitate wireless network optimizations in accordance with one potential embodiment. In particular, operations 700 can be associated with operations that can be performed to facilitate PHY bit rate optimizations for a WLAN access network (e.g., WLAN access network 110) using a PHY bit rate optimization algorithm, which can seek improve throughput for UE connected to managed APs for a particular RF cluster of a particular optimization group. For example, in some embodiments, it may be desirable to increase the PHY bit rate for managed APs having a comparatively larger number of static UEs (e.g., smart TVs, game consoles, desktop PCs, etc.) connected thereto as compared to managed APs having a smaller number of static UEs connected thereto; however, it may be desirable to increase the PHY rate when the static UEs will not be affected in term of signal strength (e.g., their RSSI is strong enough) and there is a low number of mobile UEs that may be affected. In at least one embodiment, operations 700 can be performed by optimization system 130 in cooperation with managed APs 104.1-104.5 and one or more of RRM 122, ACS 124 and/or subscriber database 126.

In one embodiment, operations 700 can be performed following formation of RF clusters of a particular optimization group for a particular evaluation time period of a particular optimization iteration. At 702, the operations can include optimization system 130 determining an RSSI performance metric for all managed APs of a particular RF cluster. In at least one embodiment, the RSSI performance metric can be an indication of whether any UE connected to a managed AP has a reported RSSI that is greater than or equal to an RSSI threshold, which can be expressed in decibel milliwatts (dBm) for a threshold percentage of time for a particular evaluation time period (e.g., more than 30% of the time of an evaluation time period, etc.).

Once the optimization system 130 determines an RSSI performance metric for each managed AP, the optimization system can perform iterative operations (710) for each managed AP to determine (712) whether an AP satisfies the RSSI performance metric and if so, to determine (714) whether any UE associated with the AP is an 802.11b UE. Based on a determination that an AP satisfies the RSSI performance metric and has no UE associated thereto, optimization system 130 can apply (716) optimization parameters to the AP, which can include removing 1 Mbps and 2 Mbps PHY bit rates from the list of usable bit rates for the AP. Based on a determination that an AP either does not satisfy the RSSI performance metric or has UE associated thereto that are 802.11b UE, no optimizations are provided for the AP. Once all managed APs for the particular RF cluster are considered using the iterative operations (710), the operations can end for the particular RF cluster. In various embodiments, operations 700 can be repeated for other RF clusters of the particular optimization group.

In at least one embodiment, a further determination can be made at 718 as to whether an AP serves only static UE(s) (e.g., televisions, gaming consoles, media centers, etc.) with strong reported RSSI or serves a combination of only static UE(s) with strong reported RSSI in combination with one or more mobile UE(s) (e.g., tablets, mobile phones, laptops, etc.) with reasonable reported RSSI. In some instances, it may be desirable to remove lower bit rate(s) from APs that serve UEs meeting one of these criteria in order to ensure higher throughput to such UE(s) without negatively impacting existing service. In at least one embodiment, a UE can be classified as a static UE if the RSSI reported by the UE is very consistent over time and the UE is never seen on other APs and UE can be classified as a mobile UE if it doesn't meet one or more of these criteria.

For an embodiment in which a further determination (718) is made as to whether an AP serves only static UE(s) having strong reported RSSI or serves a combination of only static UE(s) having strong reported RSSI and mobile UE(s) having reasonable reported RSSI, based on a determination that the AP serves UE(s) meeting one of these criteria, the operations can continue to 716 at which 1 Mbps and 2 Mbps PHY bit rates are removed from the list of usable bit rates for the AP. Based on determination at 718 that an AP does not serve any static UE(s), no optimizations are provided for the AP. In at least one embodiment a reported RSSI can be characterized as a 'strong reported RSSI' if it is greater than or equal to a first threshold of −60 dBm and a reported RSSI can be characterized as a 'reasonable reported RSSI' if it is greater than or equal to a second threshold of −70 dBm but less than the first threshold. Other RSSI thresholds can be set for certain environments based on interference, operating conditions, deployment location, combinations thereof, or any other needs and/or implementations as may be set by a service provider.

Referring to FIG. 8, FIG. 8 illustrates yet other example operations 800 that that can be performed to facilitate wireless network optimizations in accordance with one potential embodiment. In particular, operations 800 can be associated with operations that can be performed to facilitate transmit (Tx) power optimizations for a WLAN access network (e.g., WLAN access network 110) using a transmit power optimization algorithm, which can seek to reduce interference that may be caused toward one or more outlier AP(s) by one or more managed neighbor APs for an RF cluster of a particular optimization group. Thus, as illustrated for the embodiment of FIG. 8, optimization parameters can be applied to managed non-outlier APs in order to seek improvements for outlier APs. In at least one embodiment, operations 800 can be performed by optimization system 130 in cooperation with managed APs 104.1-104.5 and one or more of RRM 122, ACS 124 and/or subscriber database 126.

In one embodiment, operations 800 can be performed following formation of RF clusters for a particular optimization group for a particular evaluation time period of a particular optimization iteration. At 802, the operations can include optimization system 130 determining an RSSI performance metric for all managed non-outlier APs of a particular RF cluster. In at least one embodiment, the RSSI performance metric can be an indication of whether any UE connected to a managed AP has a reported RSSI that is greater than or equal to an RSSI dBm threshold for a threshold percentage of time for a particular evaluation time period (e.g., more than 30% of the time of an evaluation time period, etc.).

At 804, the operations can include optimization system 130 calculating a number of outlier APs that neighbor each non-outlier AP. At 806, the operations can include optimization system 130 sorting the non-outlier APs for the RF cluster based on the number of neighboring outlier APs calculated for each non-outlier AP. In one embodiment, the sorting at 806 can be performed to sort non-outlier APs in a descending order based on the number of neighboring outlier APs calculated for each non-outlier AP.

Once the optimization system 130 determines an RSSI performance metric for each managed non-outlier AP and calculates and sorts the non-outlier APs based on the number of neighboring outlier APs for each non-outlier AP, the optimization system can perform iterative operations (810) for each managed non-outlier AP, starting from the highest ranked AP, to determine (812) whether the AP satisfies the RSSI performance metric and if so, to determine (814) whether any UE associated with the AP is an 802.11b UE. Based on a determination that an AP satisfies the RSSI performance metric and has no UE associated thereto, optimization system 130 can apply (816) optimization parameters to the AP, which can include decreasing the transmit power of the non-outlier AP. In at least one embodiment, transit power for an AP can be reduced by a configurable delta amount such as, for example, 1 dB.

Based on a determination that an AP either does not satisfy the RSSI performance metric or has UE associated thereto that are 802.11b UE, no optimizations are provided for the AP. Once all managed non-outlier APs are considered using the iterative operations (810), the operations can end. In various embodiments, operations 800 can be repeated for other RF clusters of the particular optimization group.

The example operations illustrated for the embodiments of FIGS. 6-8 are only a few of the different optimizations that can be facilitated in accordance with various embodiments of communication system 100 and are not meant to limit the broad scope of the teachings of the present disclosure. Virtually any other means or methods can be used to facilitate various optimizations using one or more optimization parameter(s) using similar means and methods as those described herein and, thus, are clearly within the scope of the present disclosure.

Figure 9:
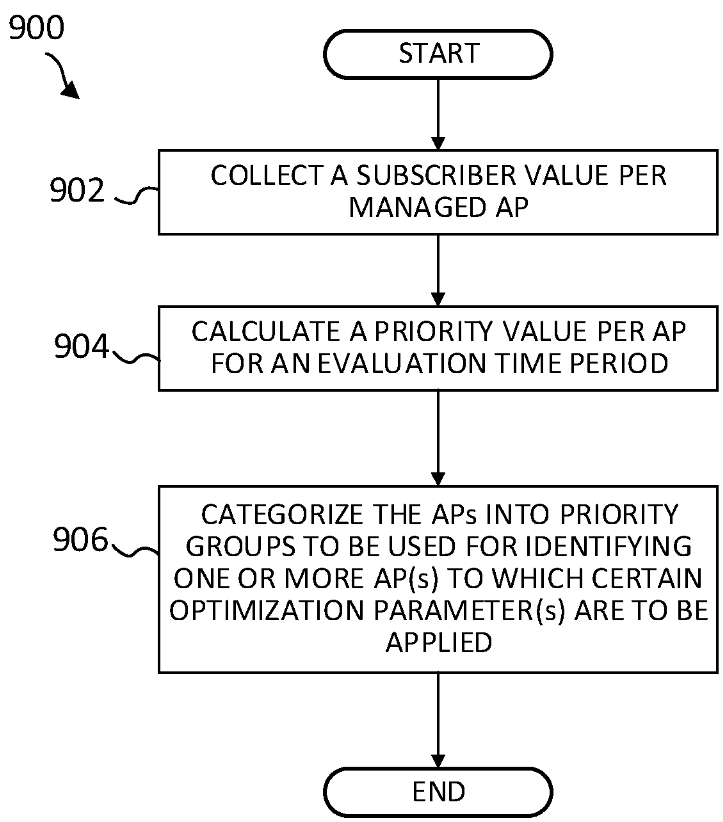
FIG. 9 is a simplified flow diagram illustrating example operations that that can be associated with prioritizing managed access points in accordance with one potential embodiment.

Referring to FIG. 9, FIG. 9 is a simplified flow diagram illustrating example operations 900 that that can be associated with prioritizing managed APs in accordance with one potential embodiment. In at least one embodiment, operations 900 can be performed by optimization system 130 in cooperation with managed APs 104.1-104.5 and one or more of RRM 122, ACS 124 and/or subscriber database 126 for a particular evaluation time period of an optimization group including managed APs 104.1-104.5.

At 902, the operations can include optimization system 130 collecting a service provider assigned subscriber value per managed AP 104.1-104.5 from subscriber database 126. At 904, the operations can include calculating a priority value per AP for the evaluation time period using the subscriber value assigned to each AP by the SP, denoted herein as '$SUBSCR_{SPVal}$', and one or more prioritization factors. At 906, the operations can include optimization system 130 categorizing the APs into priority groups to be used for identifying one or more AP(s) to which certain optimization parameters are to be applied and the operations can end. In at least one embodiment, various priority threshold values can be used to categorize each AP into a particular priority group based on a comparison between the threshold values and the priority value calculated for each AP.

Different AP priority value calculations can be performed based on various implementations and/or needs. For example, in some embodiments, VoWiFi and video usage for a particular evaluation time period can provide a basis for prioritization such that example AP priority value calculations can be performed as: VoWiFi_Video_Priority($AP_N$)=$SUBSCR_{SPVal}$*(VoWiFi usage time+Video usage time) for each AP 1-N for the particular evaluation time period, in which N is the number of managed APs of a particular optimization group. In still some embodiments, static UE data usage for a particular evaluation time period can provide a basis for prioritization such that example AP priority value calculations can be performed as: Static_UE_Usage_Priority($AP_N$)=$SUBSCR_{SPVal}$*(static UE data usage) for each AP 1-N for the particular evaluation time period, in which N is the number of managed APs of a particular optimization group. In still some embodiments, total data usage for a particular evaluation time period can provide a basis for prioritization such that example AP priority calculations can be performed as: Total_Data_Usage($AP_N$)=$SUBSCR_{SPVal}$*(total data usage) for each AP 1-N for the particular evaluation time period, in which N is the number of managed APs of a particular optimization group. In still some embodiments, active usage per minute for a particular evaluation time period can provide a basis for evaluation such that example AP priority value calculations can be performed as: Active_Usage/Min_Priority($AP_N$)=$SUBSCR_{SPVal}$*(data usage÷total active time) for each AP 1-N for the particular evaluation time period, in which N is the number of managed APs of a particular optimization group.

In still some embodiments, a weighted combination of one or more AP priority values for a particular evaluation time period can provide a basis for prioritization such that example AP priority value calculations can be performed as: Weighted_Priority_Value($AP_N$)=$W_1$*(Priority_Value$_1$($AP_N$)) $W_2$*(Priority_Value$_2$($AP_N$))+ . . . +$W_k$(Priority_Value$_M$($AP_N$)) for each AP 1-N for the particular evaluation time period, in which N is the number of managed APs for a number of RF clusters of a particular optimization group, $W_1$-$W_K$ represent a K number of priority weights (e.g., 0.1, 0.5, etc.) that can be the same or different and can be assigned to each of 1-M priority values under consideration (e.g., VoWiFi+Video usage, total data usage, etc.) following a constraint that that priority weights $W_1$-$W_K$ add up to a unity value (e.g., 1, 10, 100, etc., depending on scaling for the calculations).

These examples are just a few example AP priority value calculations that may be used in accordance with various embodiments of communication system 100 to determine a priority value per AP for an optimization group and are not meant to limit the broad scope of the teachings of the present disclosure. Virtually any other calculations can be provided using similar means and methods as those described herein and, thus, are clearly within the scope of the present disclosure.

Variations and Implementations

In regards to the internal structure associated with communication system 100, appropriate software, hardware and/or algorithms are being provisioned for UE 102.1-102.15, managed APs 104.1-104.5, RRM 122, ACS 124, subscriber database 126, and optimization system 130 within communication system 100 in order to facilitate wireless network optimization operations in a network environment as discussed for various embodiments described herein. For example, managed APs 104.1-104.5, RRM 122, and ACS 124 can also be configured with one or more processor(s), memory element(s), storage, network interfaces, logic, combinations thereof or the like to facilitate wireless network optimization operations in a network environment as discussed for various embodiments described herein.

Each of the elements of FIG. 1A may couple to one another through simple interfaces or through any other suitable connection (wired or wireless), which provides a viable pathway for network communications. As referred to herein, a physical (wired or wireless) interconnection or interface can refer to an interconnection of one element or node with one or more other element(s), while a logical interconnection or interface can refer to communications, interactions and/or operations of elements with each other, which can be directly or indirectly interconnected, in a network environment. Additionally, any one or more of these elements may be combined or removed from the architecture based on particular configuration needs.

Communications in a network environment are referred to herein as 'frames', 'messages', 'messaging' and/or 'signaling', which may be inclusive of packets. Generally, signaling is referred to in reference to control-plane or management-plane communications while messaging can be referred to in reference to control-plane, management-plane and/or data-plane communications at the application level.

As discussed herein in this Specification, a packet or frame is a formatted unit of data that can contain both control information (e.g., source and destination address, etc.) and data, which is also known as payload. In some embodiments, control information can be included in headers and trailers for packets or frames. Packets or frames, generally referred to herein as messages, can be sent and received according to any suitable communication protocols. Suitable communication protocols can include a multi-layered scheme such as the Open Systems Interconnection (OSI) Model, or any derivations or variants thereof. The terms 'data', 'information' and 'parameters' as used herein can refer to any type of binary, numeric, voice, video, textual or script data or information or any type of source or object code, or any other suitable data or information in any appropriate format that can be communicated from one point to another in electronic devices and/or networks. Additionally, signaling, frames, messages, requests, responses, replies, queries, etc. are forms of network traffic and, therefore, may comprise one or more packets.

In various embodiments, communication system 100 may implement user datagram protocol/Internet Protocol (UDP/IP) connections and/or transmission control protocol/IP (TCP/IP) communication language protocol in particular embodiments of the present disclosure. However, communication system 100 can alternatively implement any other suitable communication protocol, interface and/or standard, proprietary and/or non-proprietary, for transmitting and receiving messaging and/or signaling. Other protocols, interfaces and/or communication standards that can be used in communication system 100 can include a Terminal Access controller access-control system (TACACS), TACACS+, Proxy Mobile IP version 6 (PMIPv6), Proxy Mobile IP version 4 (PMIPv4), Extensible Messaging and Presence Protocol (XMPP), General Packet Radio Service (GPRS) Tunneling Protocol (GTP) (version 1 or version 2), Generic Route Encapsulation (GRE), Ethernet over GRE (EoGRE), Extensible Messaging and Presence Protocol (XMPP), Simple Object Access Protocol (SOAP), SOAP over Hypertext Transfer Protocol (HTTP), Representational State Transfer (REST), combinations thereof, or the like. In some embodiments, secure communications can be facilitated using TCP/IP Secure Sockets Layer (SSL) communications.

In various embodiments, a UE (e.g., any of UE 102.1-102.15 and/or any other UE that may be present in communication system 100) can be inclusive of devices used to initiate and/or respond to communications (e.g., Interest packets, Data packets, etc.) in a network, such as a computer, an electronic device such as an Internet of Things (IoT) device (e.g., an appliance, a thermostat, a sensor, a home automation controller, a voice activated device, a parking meter, etc.), a personal digital assistant (PDA), a laptop or electronic notebook, a gaming system, a vehicle infotainment system, a home entertainment electronic device (e.g., a smart television, digital recording device, speaker, etc.), a cellular telephone, an IP phone, an electronic device having cellular and/or Wi-Fi connection capabilities, a wearable electronic device or any other device, component, element, or object capable of initiating voice, audio, video, media, or data exchanges within communication system 100. A UE may also be inclusive of a suitable interface to a human user such as a microphone, a display, a keyboard, or other terminal equipment. In some embodiments, UE can be classified as static (e.g., unmoving or moving with relatively low frequency) such as a television, desktop computer, thermostat, etc. or mobile (e.g., moving or moving with relatively high frequency such as a mobile phone, wearable electronic device, laptop, etc.

A UE may also be any device that seeks to initiate a communication on behalf of another entity or element such as a program, application, a database, or any other component, device, element, or object capable of initiating an exchange within communication system 100. In at least some embodiments, a UE can be associated with users that communicate in communication system 100. In other embodiments, UE may facilitate data exchanges while operating independently of user interactions. Within communication system 100, IP addresses, if used, can be assigned using Dynamic Host Configuration Protocol (DHCP), Stateless Address Auto-configuration (SLAAC), or any suitable variation thereof. IP addresses, if used within communication system 100, can include IP version 4 (IPv4) and/or IPv6 addresses.

Communication system 100 can include one or more networks, such as WLAN access network 110, SP1 network 120 and/or Internet 140, which can represent a series of points or network elements of interconnected communication paths for receiving and transmitting messages (e.g., packets of information) that propagate through the one or more networks. These network elements offer communicative interfaces and faces that facilitate communications between the network elements. A network can comprise any number of hardware and/or software elements coupled to (and in communication with) each other through a communication medium. Such networks can include, but are not limited to, any local area network (LAN), virtual local area network (VLAN), wide area network (WAN) such as the Internet, wireless local area network (WLAN), metropolitan area network (MAN), Intranet, Extranet, virtual private network (VPN), any other appropriate architecture or system that facilitates communications in a network environment or any suitable combination thereof.

Networks through which communications propagate in communication system 100 can use any suitable technologies for communication including wireless (e.g., 3G/4G/5G/nG network, Institute of Electrical and Electronics Engineers (IEEE) Std 802.11, WiMAX, IEEE Std 802.16, Radio-frequency Identification (RFID), Near Field Communication (NFC), Bluetooth™ etc.), and/or wired (e.g., T1 lines, T3 lines, digital subscriber lines (DSL), Ethernet, Fibre Channel, etc.) communication. Generally, any suitable means of communication may be used such as electric, sound, light, infrared, and/or radio.

In various example implementations, managed APs 104.1-104.5, RRM 122, ACS 124, subscriber database 126, and/or optimization system 130 discussed for various embodiments described herein can encompass network elements such as, for example, network appliances, forwarders, routers, servers, switches, gateways, bridges, loadbalancers, firewalls, processors, modules, radio receivers/transmitters or any other suitable device, component, element, or object operable to exchange information that facilitates or otherwise helps to facilitate various wireless network optimization operations in a network environment (e.g., for networks such as those illustrated in FIG. 1A) as described for various embodiments discussed herein. In various embodiments, one or more of the managed APs 104.1-104.5, RRM 122, ACS 124, subscriber database 126, and/or optimization system 130 discussed herein can include software (or reciprocating software) that can coordinate in order to achieve operations associated with providing wireless network optimizations in a network environment as discussed herein and may include any suitable algorithms, hardware, software, components, modules, logic, clients, interfaces, and/or objects that facilitate the operations thereof. This may be inclusive of appropriate algorithms, communication protocols, interfaces, and/or standards, proprietary and/or non-proprietary, that allow for the effective exchange of data or information.

In various embodiments, managed APs 104.1-104.5, RRM 122, ACS 124, subscriber database 126, and/or optimization system 130 as discussed herein may keep information in any suitable memory element [e.g., random access memory (RAM), read only memory (ROM), an erasable programmable read only memory (EPROM), application specific integrated circuit (ASIC), etc.], software, hardware, or in any other suitable component, device, element, and/or object where appropriate and based on particular needs. Any of the memory items discussed herein should be construed as being encompassed within the broad term 'memory element'. Information being tracked or sent to one or more of managed APs 104.1-104.5, RRM 122, ACS 124, subscriber database 126, and/or optimization system 130 discussed herein could be provided in any database, table, register, control list, cache, storage and/or storage structure: all of which can be referenced at any suitable timeframe. Any such storage options may also be included within the broad term 'memory element' as used herein. Any of potential processing elements, controllers, systems, managers, logic and/or machines described herein can be construed as being encompassed within the broad term 'processor'. In various embodiments, managed APs 104.1-104.5, RRM 122, ACS 124, subscriber database 126, and/or optimization system 130 discussed herein can also include suitable interfaces and faces for receiving, transmitting, and/or otherwise communicating data or information in a network environment.

Note that in certain example implementations, operations as outlined herein to facilitate wireless network optimizations in a network environment may be implemented by logic encoded in one or more tangible media, which may be inclusive of non-transitory tangible media and/or non-transitory computer readable storage media (e.g., embedded logic provided in an ASIC, in digital signal processing (DSP) instructions, software [potentially inclusive of object code and source code] to be executed by a processor, or other similar machine, etc.). In some of these instances, a memory element and/or storage [as shown in FIG. 1B] can store data, software, code, instructions (e.g., processor instructions), logic, parameters, combinations thereof, or the like used for operations described herein. This includes memory elements and/or storage being able to store data, software, code, instructions (e.g., processor instructions), logic, parameters, combinations thereof, or the like that are executed to carry out operations described herein.

A processor (e.g., a hardware processor) can execute any type of instructions associated with data to achieve the operations detailed herein. In one example, a processor [as shown in FIG. 1B] can transform an element or an article (e.g., data, information) from one state or thing to another state or thing. In another example, operations outlined herein may be implemented with logic, which can include fixed logic, hardware logic, programmable logic, digital logic, etc. (e.g., software/computer instructions executed by a processor) and/or one or more the elements identified herein could be some type of a programmable processor, programmable digital logic (e.g., a field programmable gate array (FPGA), a DSP processor, an EPROM, a controller, an electrically erasable PROM (EEPROM), or an ASIC) that includes digital logic, software, code, electronic instructions, or any suitable combination thereof.

One or more advantages mentioned herein do not in any way suggest that any one of the embodiments necessarily provides all the described advantages or that all the embodiments of the present disclosure necessarily provide any one of the described advantages. Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein this Specification, can be inclusive of an executable file comprising instructions that can be understood and processed on a server, computer, processor, machine, compute node, combinations thereof or the like and may further include library modules loaded during execution, object files, system files, hardware logic, software logic, or any other executable modules.

It is also important to note that the operations and steps described with reference to the preceding FIGURES illustrate only some of the possible scenarios that may be executed by, or within, the communication system 100. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Note that with the examples provided above, as well as numerous other examples provided herein, interaction may be described in terms of one, two, three, or four network elements. However, this has been done for purposes of clarity and example only. In certain cases, it may be easier to describe one or more of the functionalities by only referencing a limited number of network elements. It should be appreciated that communication system 100 (and its teachings) are readily scalable and can accommodate a large number of components, as well as more complicated/sophisticated arrangements and configurations. Accordingly, the examples provided should not limit the scope or inhibit the broad teachings of communication system 100 as potentially applied to a myriad of other architectures.

As used herein, unless expressly stated to the contrary, use of the phrase 'at least one of', 'one or more of' and 'and/or' are open ended expressions that are both conjunctive and disjunctive in operation for any combination of named elements, conditions, or activities. For example, each of the expressions 'at least one of X, Y and Z', 'at least one of X, Y or Z', 'one or more of X, Y and Z', 'one or more of X, Y or Z' and 'A, B and/or C' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms 'first', 'second', 'third', etc., are intended to distinguish the particular nouns (e.g., element, condition, module, activity, operation, etc.) they modify. Unless expressly stated to the contrary, the use of these terms is not intended to indicate any type of order, rank, importance, temporal sequence, or hierarchy of the modified noun. For example, 'first X' and 'second X' are intended to designate two X elements that are not necessarily limited by any order, rank, importance, temporal sequence, or hierarchy of the two elements. As referred to herein, 'at least one of', 'one or more of', and the like can be represented using the '(s)' nomenclature (e.g., one or more element(s)).

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access, interfaces and protocols, communication system 100 may be applicable to other exchanges or routing protocols, interfaces and/or communications standards, proprietary and/or non-proprietary. Moreover, although communication system 100 has been illustrated with reference to particular elements and operations that facilitate the communication process, these elements, and operations may be replaced by any suitable architecture or process that achieves the intended functionality of communication system 100.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:

determining one or more outlier access points (APs) of a plurality of APs managed by a same service provider, wherein the determining is performed based on performance metrics calculated for each of the plurality of APs managed by the same service provider and wherein each outlier AP has a performance metric that fails to satisfy a performance metric threshold;

identifying a Radio Frequency (RF) cluster to which each outlier AP belongs, wherein each outlier AP belongs to only one RF cluster by:

identifying one or more neighbor APs of each outlier AP;

creating an RF cluster that identifies neighbor(s) for each outlier AP;

determining whether any outlier AP is a neighbor of another outlier AP; and merging any RF cluster for two or more outlier APs based on a determination that the two or more outlier APs are neighbors of each other;

applying one or more optimization parameters to one or more APs for one or more RF clusters, wherein the optimization parameters are applied to improve performance for at least one of the one or more outlier APs; and calculating new performance metrics for the plurality of APs to determine whether any of the plurality of APs fail to satisfy the performance metric threshold after the one or more optimization parameters are applied.

2. The method of claim 1, further comprising:

repeating the determining, the identifying, the applying and the calculating for any outlier AP that fails to satisfy the performance metric threshold to improve performance for at least one AP of the plurality of APs.

3. The method of claim 1, further comprising:

storing, for each of the one or more outlier APs, a pre-optimization state that identifies operational parameters associated with each of the one or more outlier APs before applying the one or more optimization parameters;

determining degraded performance by a particular outlier AP following the applying of the one or more optimization parameters to the particular AP; and resetting operation parameters for the particular outlier AP to their pre-optimization state.

4. The method of claim 1, wherein determining the one or more outlier AP(s) is performed after an evaluation time period during which data is collected for each of the plurality of APs managed by the same service provider and before the one or more optimization parameters are applied and wherein no RF cluster determinations are performed during the evaluation time period.

5. The method of claim 1, wherein neighbor AP(s) of a particular AP comprise:

one or more AP(s) managed by the same service provider;

one or more AP(s) managed by one or more different service provider(s); and one or more unmanaged AP(s).

6. The method of claim 1, further comprising:

determining one or more optimization parameters for one or more outlier AP of one or more cluster, wherein the one or more optimization parameters include at least one of:

a transmission power value or transmission power range;

a communication channel number or a particular combination of communication channel numbers;

a communication channel band or a combination of communication channel bands;

a communication frequency or a range of communication frequencies; and a physical layer bit rate value or physical layer bit rate range.

7. The method of claim 1, further comprising:

prioritizing a plurality of outlier APs belonging to a particular RF cluster to determine a priority value for each outlier AP belonging to the particular RF cluster; and applying one or more optimization parameters to the plurality of outlier APs based on whether the priority value for each outlier satisfies a priority threshold.

8. The method of claim 7, wherein the applying further comprises:

applying one or more optimization parameters to one or more first outlier APs that satisfy the priority threshold to improve performance of the one or more first outlier APs; and applying one or more optimization parameters to one or more second outlier APs that do not satisfy the priority threshold to degrade performance of the one or more second outlier APs.

9. The method of claim 7, wherein the prioritizing further comprises:

calculating the priority value for each outlier AP based on one or more priority parameters, wherein the priority parameters comprise one or more of:

(a) a total data usage for each outlier AP for an evaluation time period during which data is collected for each of the plurality of APs;

(b) a total number of mobile user equipment served by each outlier AP;

(c) a total number of static user equipment served by each outlier AP;

(d) a total active time per day for each outlier AP for an evaluation time period during which data is collected for each of the plurality of APs;

(e) a total amount of one of Voice over WiFi (VoWiFi) usage and video usage for each outlier AP;

(f) historical priority parameters associated with one or more of: (a), (b), (c), (d) and (e), wherein the historical priority parameters can be associated with a time period less than or equal to one previous year for which the priority parameters have been collected; and (g) a subscriber value for each outlier AP, wherein the subscriber value for each outlier AP is assigned by the service provider.

10. The method of claim 9, wherein the evaluation time period can include one or more of:

a randomly selected number of minutes in a day, a particular number of minutes in the day or a periodically selected number of minutes in the day;

one or more randomly selected days of a week, one or more particular days of the week or one or more particular days of the week that are evaluated periodically on a scheduled basis; and one or more randomly selected months of a year, one or more particular months of the year or one or more particular months of the year that are evaluated periodically on a scheduled basis.

11. One or more non-transitory tangible media encoding logic that includes instructions for execution by a processor, wherein the execution causes the processor to perform operations, comprising:

determining one or more outlier access points (APs) of a plurality of APs managed by a same service provider, wherein the determining is performed based on performance metrics calculated for each of the plurality of APs managed by the same service provider and wherein each outlier AP has a performance metric that fails to satisfy a performance metric threshold;

identifying a Radio Frequency (RF) cluster to which each outlier AP belongs, wherein each outlier AP belongs to only one RF cluster by:

identifying one or more neighbor APs of each outlier AP;

creating an RF cluster that identifies neighbor(s) for each outlier AP;

determining whether any outlier AP is a neighbor of another outlier AP; and merging any RF cluster for two or more outlier APs based on a determination that the two or more outlier APs are neighbors of each other;

applying one or more optimization parameters to one or more APs for one or more RF clusters, wherein the optimization parameters are applied to improve performance for at least one of the one or more outlier APs; and calculating new performance metrics for the plurality of APs to determine whether any of the plurality of APs fail to satisfy the performance metric threshold after the one or more optimization parameters are applied.

12. The media of claim 11, wherein the execution causes the processor to perform further operations, comprising:

repeating the determining, the identifying, the applying and the calculating for any outlier AP that fails to satisfy the performance metric threshold to improve performance for at least one AP of the plurality of APs.

13. The media of claim 11, wherein the execution causes the processor to perform further operations, comprising:

storing, for each of the one or more outlier APs, a pre-optimization state that identifies operational parameters associated with each of the one or more outlier APs before applying the one or more optimization parameters;

determining degraded performance by a particular outlier AP following the applying of the one or more optimization parameters to the particular AP; and resetting operation parameters for the particular outlier AP to their pre-optimization state.

14. The media of claim 11, wherein the execution causes the processor to perform further operations, comprising:

determining one or more optimization parameters for one or more outlier AP of one or more cluster, wherein the one or more optimization parameters include at least one of:

a transmission power value or transmission power range;

a communication channel number or a particular combination of communication channel numbers;

a communication channel band or a combination of communication channel bands;

a communication frequency or a range of communication frequencies; and a physical layer bit rate value or physical layer bit rate range.

15. An optimization system comprising:

at least one memory element for storing data; and at least one processor for executing instructions associated with the data, wherein the executing causes the optimization system to perform operations, comprising:

determining one or more outlier access points (APs) of a plurality of Aps managed by a same service provider, wherein the determining is performed based on performance metrics calculated for each of the plurality of APs managed by the same service provider and wherein each outlier AP has a performance metric that fails to satisfy a performance metric threshold;

identifying a Radio Frequency (RF) cluster to which each outlier AP belongs, wherein each outlier AP belongs to only one RF cluster;

applying one or more optimization parameters to one or more APs for one or more RF clusters, wherein the optimization parameters are applied to improve performance for at least one of the one or more outlier APs;

calculating new performance metrics for the plurality of APs to determine whether any of the plurality of APs fail to satisfy the performance metric threshold after the one or more optimization parameters are applied;

prioritizing a plurality of outlier APs belonging to a particular RF cluster to determine a priority value for each outlier AP belonging to the particular RF cluster; and applying one or more optimization parameters to the plurality of outlier APs based on whether the priority value for each outlier satisfies a priority threshold.

16. The optimization system of claim 15, wherein identifying the RF cluster to which each outlier AP belongs further comprises:

identifying one or more neighbor AP(s) of each outlier AP;

creating an RF cluster that identifies neighbor(s) for each outlier AP;

determining whether any outlier AP is a neighbor of another outlier AP; and merging any RF cluster for two or more outlier APs based on a determination that the two or more outlier APs are neighbors of each other.

17. The optimization system of claim 15, wherein the executing causes the optimization system to perform further operations, comprising:

determining one or more optimization parameters for one or more outlier AP of one or more cluster, wherein the one or more optimization parameters include at least one of:

a transmission power value or transmission power range;

a communication channel number or a particular combination of communication channel numbers;

a communication channel band or a combination of communication channel bands;

a communication frequency or a range of communication frequencies; and a physical layer bit rate value or physical layer bit rate range.

* * * * *